(12) United States Patent
Kajino

(10) Patent No.: US 8,400,900 B2
(45) Date of Patent: Mar. 19, 2013

(54) LENS, LENS MOUNTING METHOD AND OPTICAL PICKUP DEVICE

(75) Inventor: Toru Kajino, Kodaira (JP)

(73) Assignees: Sanyo Electric Co., Ltd., Osaka (JP); Sanyo Optec Design Co., Ltd., Gunma (JP)

( * ) Notice: Subject to any disclaimer, the term of this patent is extended or adjusted under 35 U.S.C. 154(b) by 0 days.

(21) Appl. No.: 13/495,558

(22) Filed: Jun. 13, 2012

(65) Prior Publication Data
US 2012/0314555 A1  Dec. 13, 2012

(30) Foreign Application Priority Data

Jun. 13, 2011 (JP) ................... 2011-130793
May 8, 2012 (JP) ................... 2012-106521

(51) Int. Cl.
*G11B 7/00* (2006.01)

(52) U.S. Cl. ..................................... 369/112.2

(58) Field of Classification Search ............... 369/112.2, 369/112.26, 112.24, 112.23, 112.13, 44.23, 369/44.12, 44.14
See application file for complete search history.

(56) References Cited

U.S. PATENT DOCUMENTS 7,295,225 B2 * 11/2007 Ohsugi .......................... 347/244

FOREIGN PATENT DOCUMENTS

JP  2000-293860 A  10/2000

* cited by examiner

*Primary Examiner* — Nabil Hindi
(74) *Attorney, Agent, or Firm* — Ditthavong Mori & Steiner, P.C.

(57) ABSTRACT

A lens includes a lens portion which condenses light; a reflecting flat portion which is formed in a periphery of the lens portion and reflects parallel light to be irradiated to the reflecting flat portion in a direction opposite to the irradiation direction; and a flange portion which is adhered to a lens holder by an adhesive. An applied portion of the adhesive which is formed on the flange portion is inclined with respect to the reflecting flat portion.

17 Claims, 19 Drawing Sheets

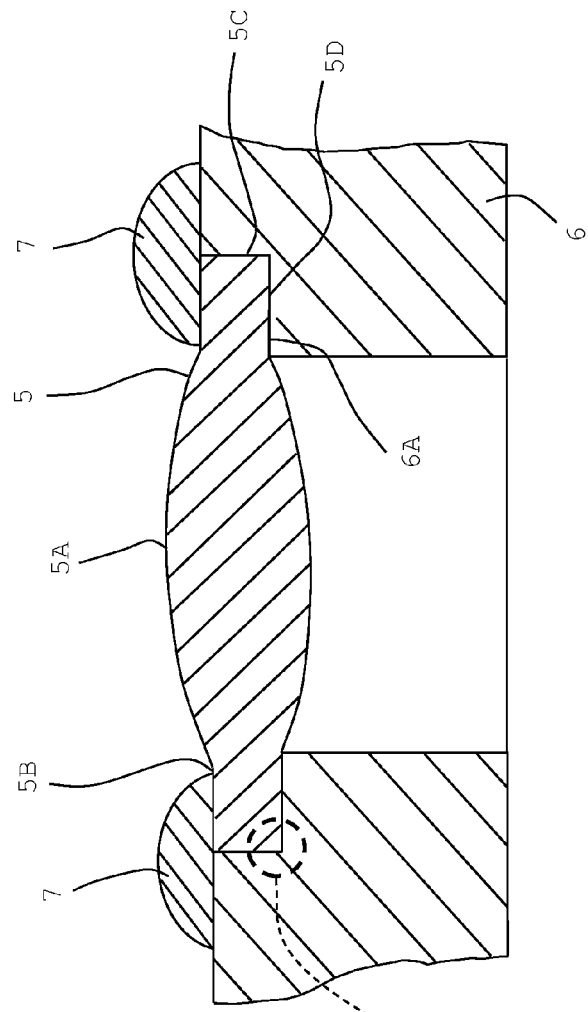
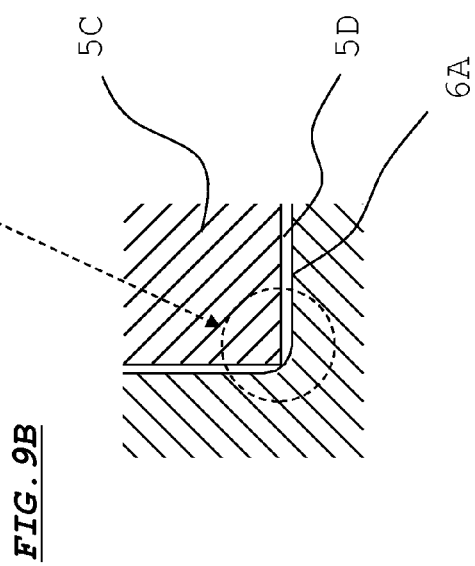
FIG. 9A
FIG. 9B

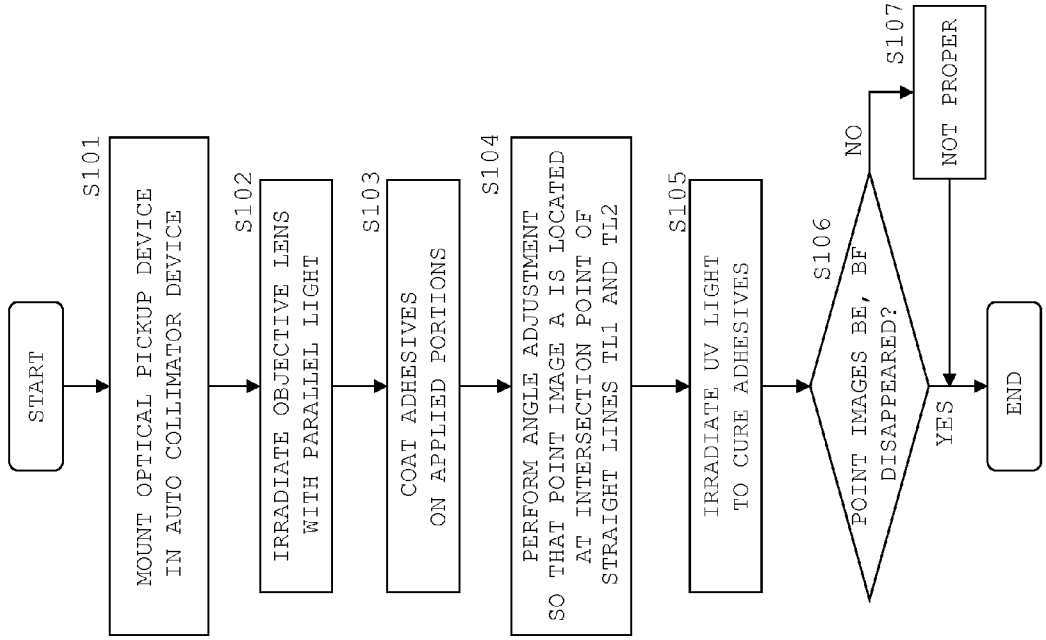
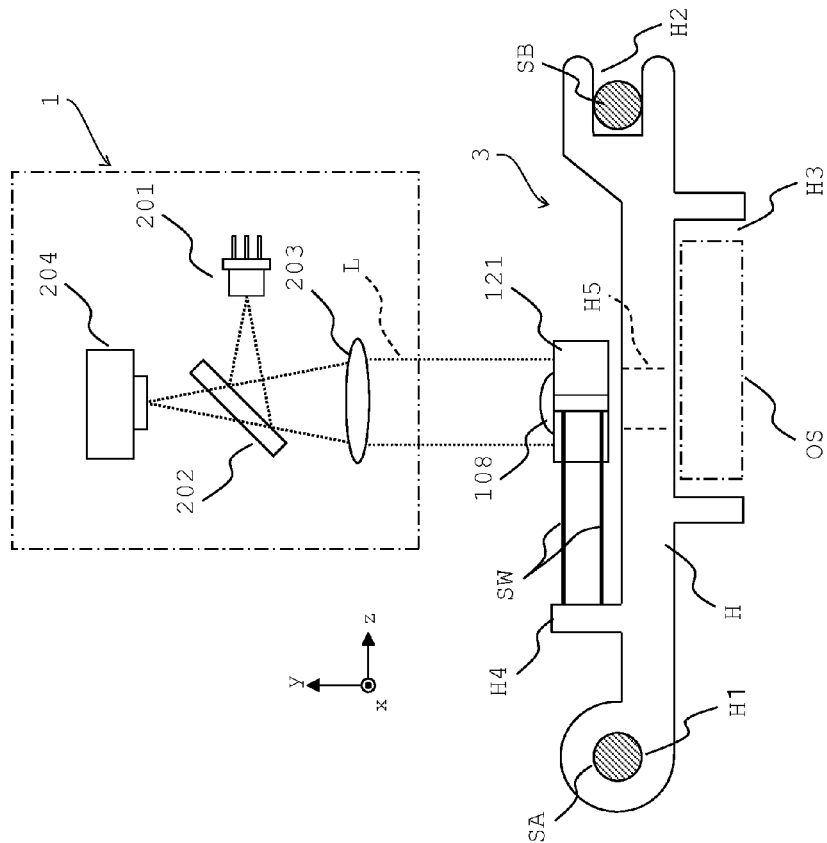

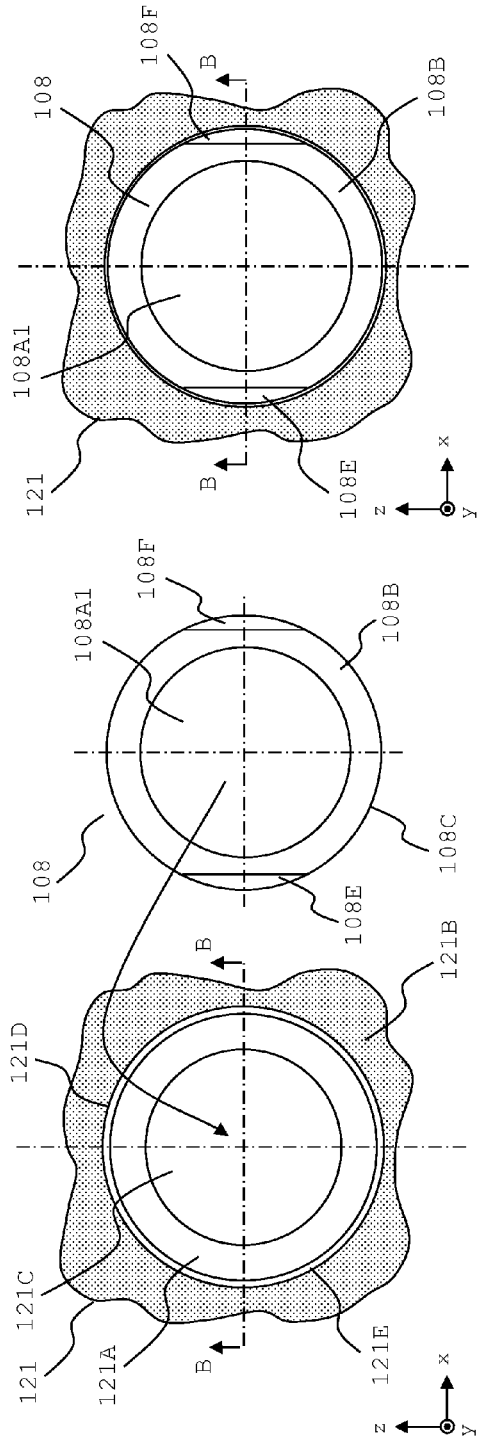
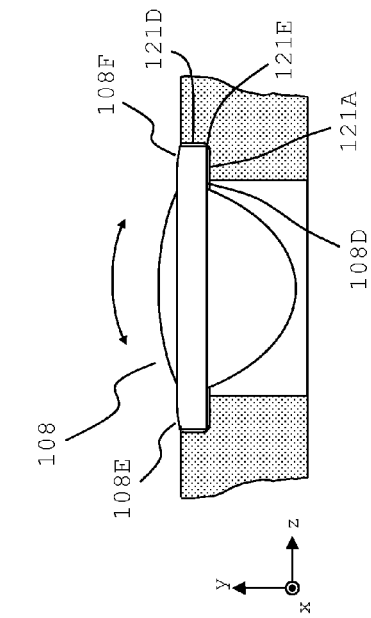
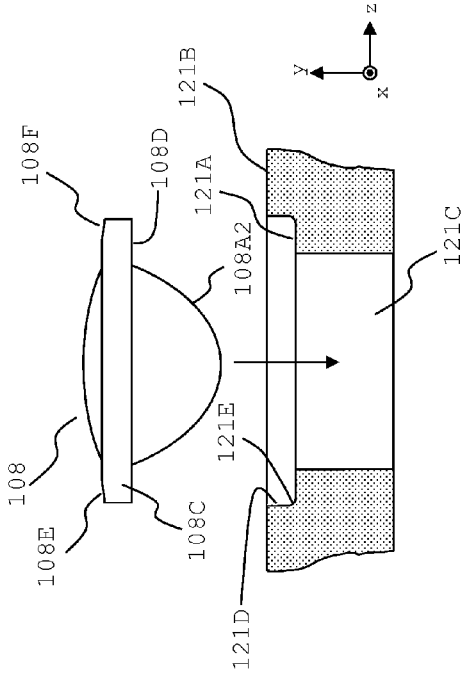

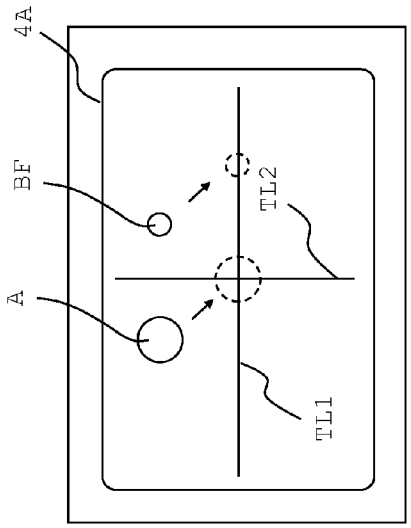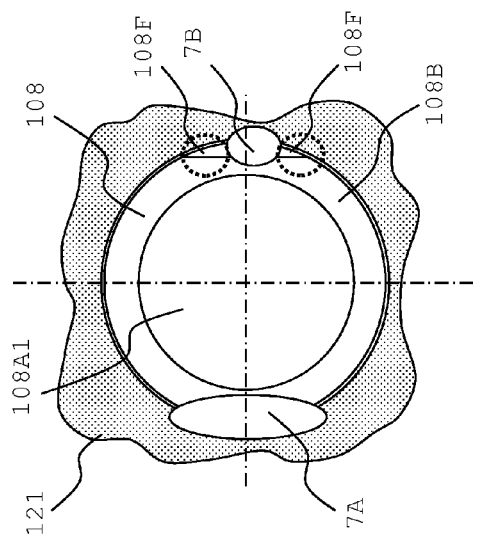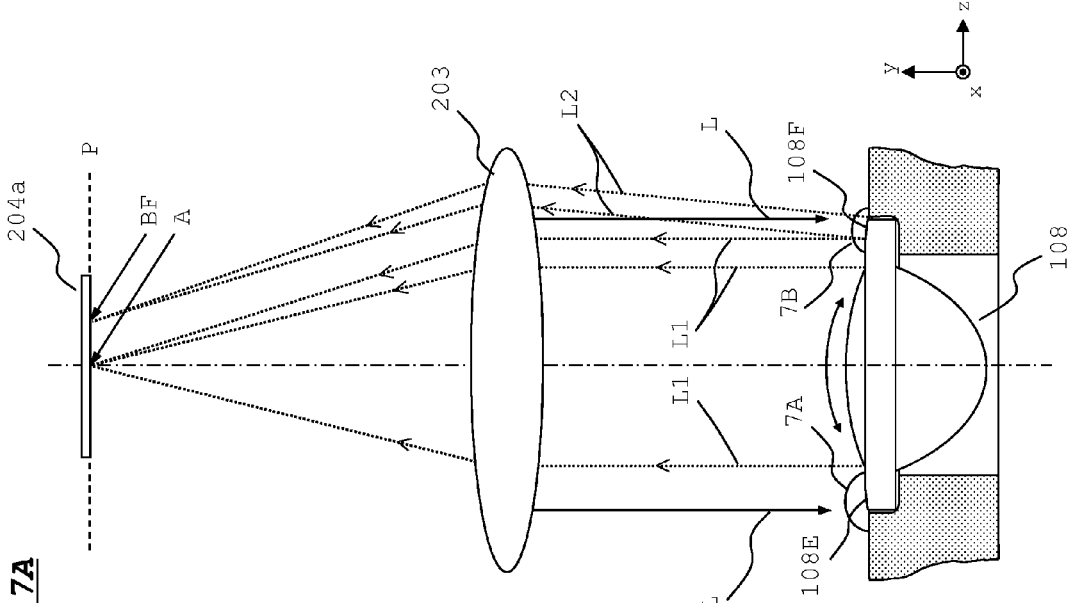

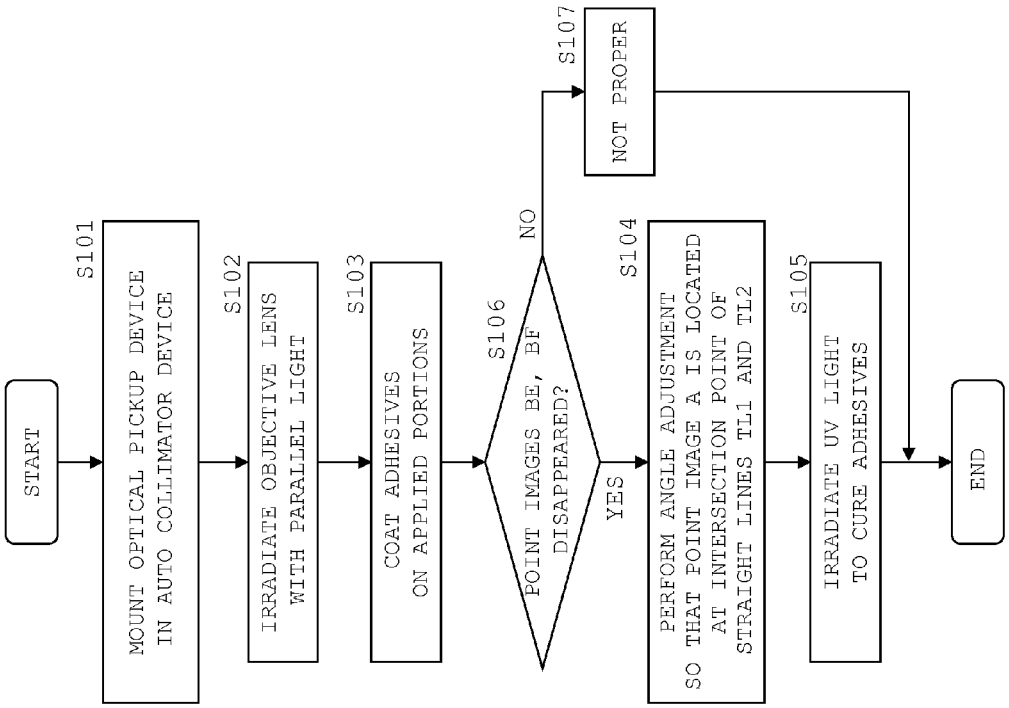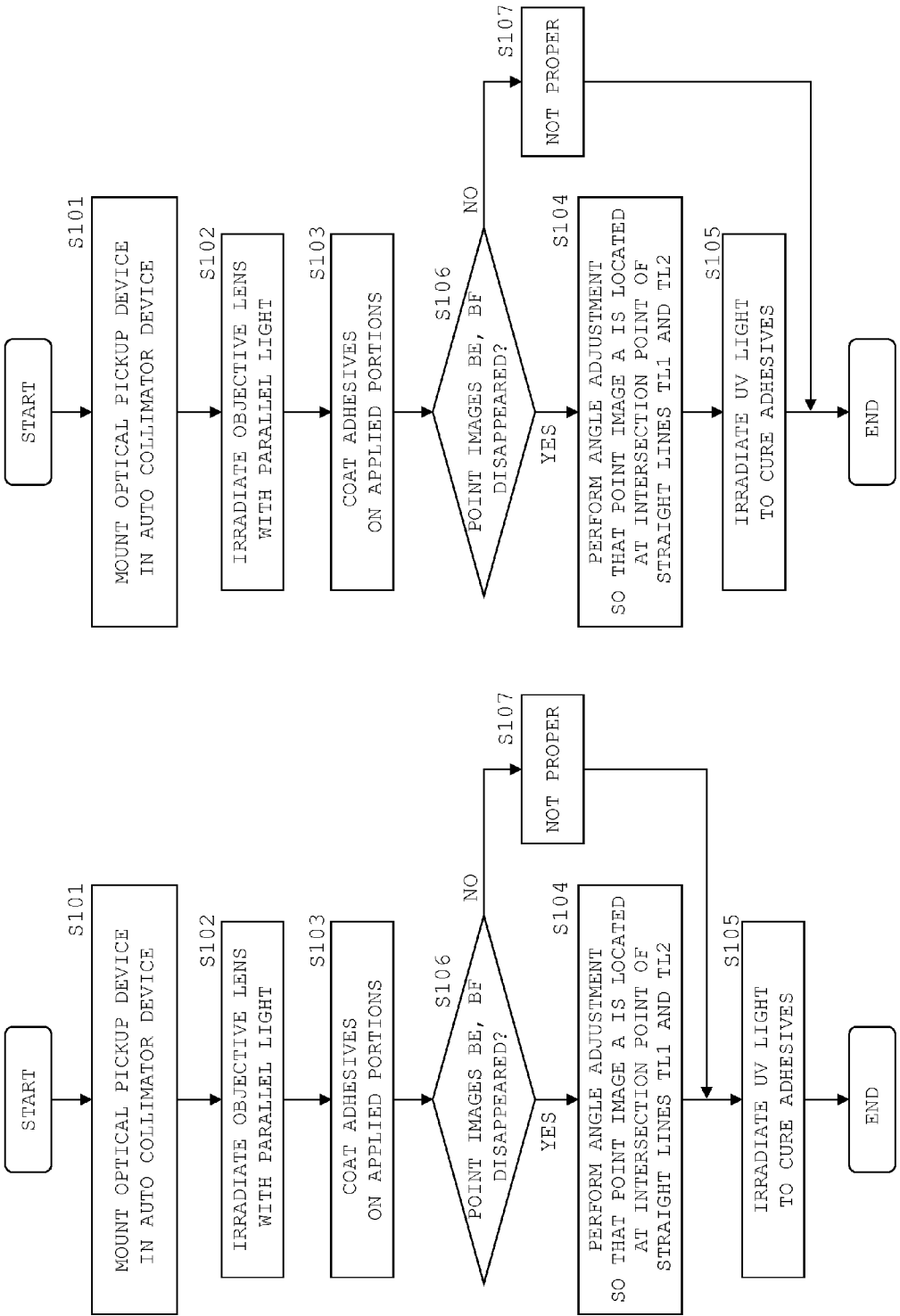

LENS, LENS MOUNTING METHOD AND OPTICAL PICKUP DEVICE

This application claims priority under 35 U.S.C. Section 119 of Japanese Patent Applications No. 2011-130793 filed on Jun. 13, 2011, entitled "LENS", and No. 2012-106521 filed on May 8, 2012, entitled "LENS, LENS MOUNTING METHOD AND OPTICAL PICKUP DEVICE. The disclosure of the above application is incorporated herein by reference.

BACKGROUND OF THE INVENTION

1. Field of the Invention

The present invention relates to a lens used in an optical pickup device or the like which performs an operation of reading out signals recorded in an optical disc by laser light, a method for mounting the lens on a mounting portion, and an optical pickup device incorporated with the lens.

2. Disclosure of Related Art

An optical disc apparatus which applies laser light emitted from an optical pickup device to a signal recording layer of an optical disc to perform an operation of reading out signals recorded in the optical disc and an operation of recording signals into the optical disc has been widely used. As such an optical disc apparatus, an apparatus using an optical disc called CD (Compact Disc) or DVD (Digital Versatile Disc) is widely known in general. Further, an optical disc apparatus using an optical disc with improved recording density, i.e., a Blu-ray standard optical disc has been developed in these days.

An optical pickup device is configured to condense laser light emitted from a laser diode onto a signal recording layer of an optical disc by a light-condensing function of an objective lens. In the optical pickup device, a photodetector is irradiated with laser light reflected from the signal recording layer. The photodetector is provided with a sensor such as a quadrant sensor. A focus error signal and a tracking error signal are generated from signals obtained from changes in light amount and position of the laser light applied to the quadrant sensor. By controlling a position of the objective lens using the focus error signal and the tracking error signal, the operation of reading out a signal recorded in the optical disc or the like is performed.

An objective lens provided in an optical pickup device is fixedly attached by an adhesive to a lens holder supported by a support member such as four support wires so that the objective lens can perform a displacement operation (a focus control operation) in a direction perpendicular to the signal plane of the optical disc and a displacement operation (a tracking control operation) in a radial direction of the optical disc.

It is necessary to configure the optical pickup device in such a manner that the angle of an optical axis of the objective lens becomes optimum with respect to a signal plane of the optical disc so as to perform the focus control operation and the tracking control operation accurately. Such an angle adjustment operation for the objective lens can be performed with e.g. an auto collimator device.

The angle adjustment operation is performed after a UV curable adhesive has been applied between the objective lens and the lens holder. Specifically, the angle adjustment operation is performed in a state that the adhesive has not been cured, i.e., UV light has not been irradiated. When the mounted angle of the objective lens is adjusted to be an optimum angle by the angle adjustment operation, the UV light is irradiated to cure the adhesive.

In the case where such an application work of the adhesive is performed by hands, there may be a variation in application amount and position of the adhesive. If there is a variation in application amount and position of the adhesive, there may occur problems in an oscillation characteristic and reliability of the optical pickup device. In view of the above, the adhesive application work must be performed exactly.

Since visual inspection by workers is conducted for judgment and confirmation on whether an exact application work of the adhesive is performed or not, there is a problem that technical sophistication and confirming ability of workers may influence quality of the optical pickup device.

SUMMARY OF THE INVENTION

A first aspect of the invention relates to a lens. The lens according to the first aspect includes a lens portion which condenses light; a reflecting flat portion which is formed in a periphery of the lens portion and reflects parallel light irradiated to the reflecting flat portion; and a flange portion which is adhered to a lens holder by an adhesive. An applied portion of the adhesive which is formed on the flange portion is inclined with respect to the reflecting flat portion.

A second aspect of the invention relates to a method for mounting a lens. In the second aspect, the lens according to the first aspect is used. The method for mounting the lens according to the second aspect includes steps of irradiating the applied portion which is inclined with the parallel light emitted from an auto collimator device; and determining whether an application state of the adhesive is proper or not based on presence or absence of the parallel light reflected on the applied portion.

The method for mounting the lens according the second aspect may further includes a step of detecting the presence or absence of the parallel light reflected on the applied portion by the auto collimator device.

A third aspect of the invention relates to an optical pickup device. The optical pickup device according to the third aspect includes a laser light source which emits laser light; a photodetector which receives the laser light reflected on a disc; and an optical system which guides the laser light emitted from the laser light source to the disc, and guides the laser light reflected on the disc to the photodetector, the optical system including the lens according to the first aspect.

BRIEF DESCRIPTION OF THE DRAWINGS

These and other objects, and novel features of the present invention will become more apparent upon reading the following detailed description of the embodiment along with the accompanying drawings.

FIGS. 9A and 9B are cross-sectional views for showing an arrangement of the lens according to the comparative example.

FIG. 12A is a diagram showing arrangements of the optical pickup device and an auto collimator device according to the configuration example, and FIG. 12B is a flowchart showing an objective lens mounting process.

FIGS. 13A through 13D are diagrams respectively showing an arrangement of a holder, and relationships between the objective lens and the holder according to the configuration example.

FIGS. 17A through 17C are diagrams respectively exemplifying a state of light, a state of a screen to be displayed on the display portion and a mounted state of the objective lens on the holder in the objective lens mounting process according to the configuration example.

FIGS. 19A and 19B are flowcharts respectively showing an objective lens mounting process according to a modification example.

The drawings are provided mainly for describing the present invention, and do not limit the scope of the present invention.

DESCRIPTION OF PREFERRED EMBODIMENTS

The embodiment is an example, in which the invention is applied to an objective lens used for an optical pickup device which condenses laser light emitted from a laser diode onto a signal recording layer of an optical disc and a method for mounting the objective lens.

Comparative Example

First, an arrangement of a lens and a method for mounting the lens in a comparative example are described, referring to FIGS. 5 through 9B.

Figure 5:
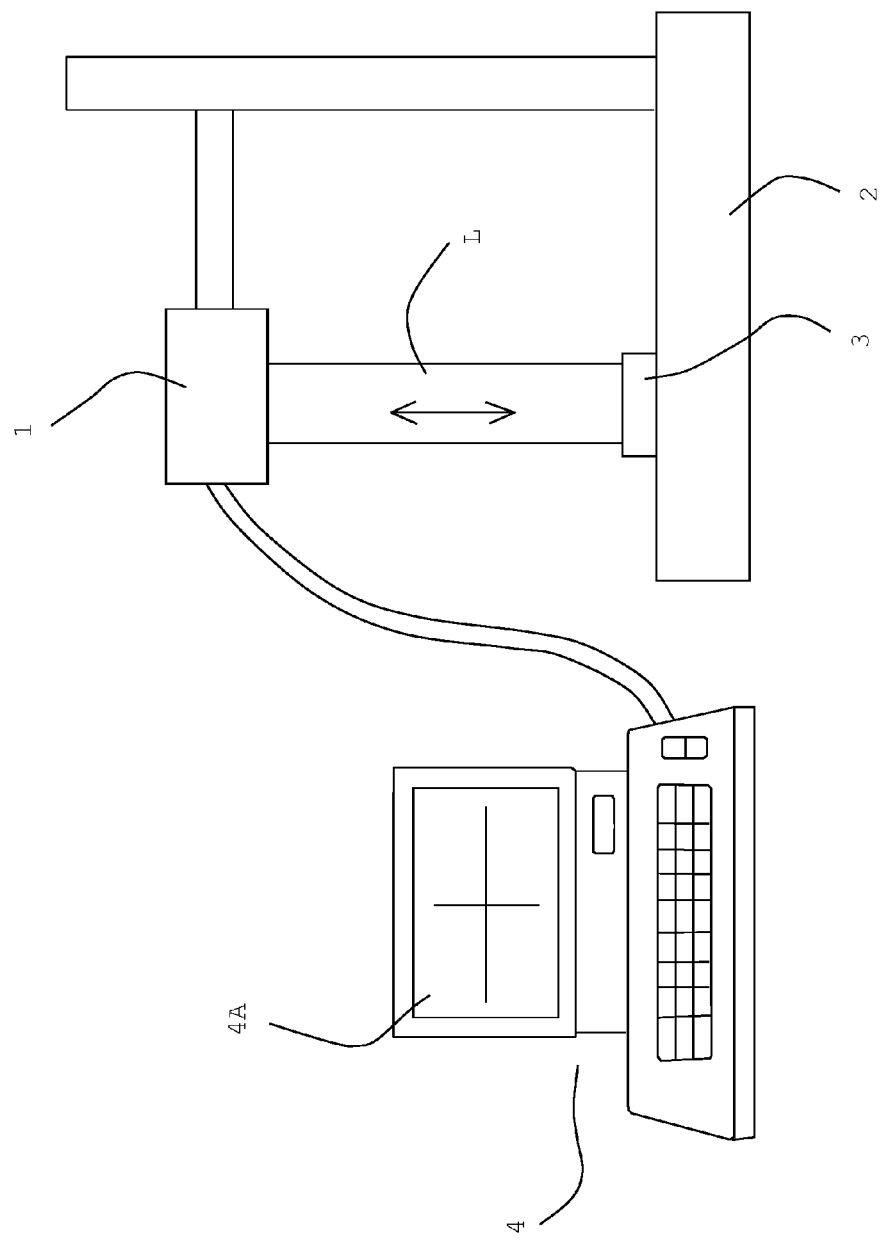
FIG. 5 is an overall diagram for showing an adjustment operation to be performed by an auto collimator device.

In FIG. 5, reference numeral 1 is an auto collimator device. The auto collimator device 1 is configured so as to irradiate an objective lens incorporated in an optical pickup device 3 mounted on a reference table 2 with parallel light L, and to receive the laser light reflected on the objective lens. Reference numeral 4 is a computing device. The computing device 4 receives a signal obtained from the auto collimator device 1 and executes control of the auto collimator device 1. The computing device 4 is configured such that workers can recognize and adjust an angle of the objective lens based on pictorial figures displayed on a display portion 4A.

Figure 8:
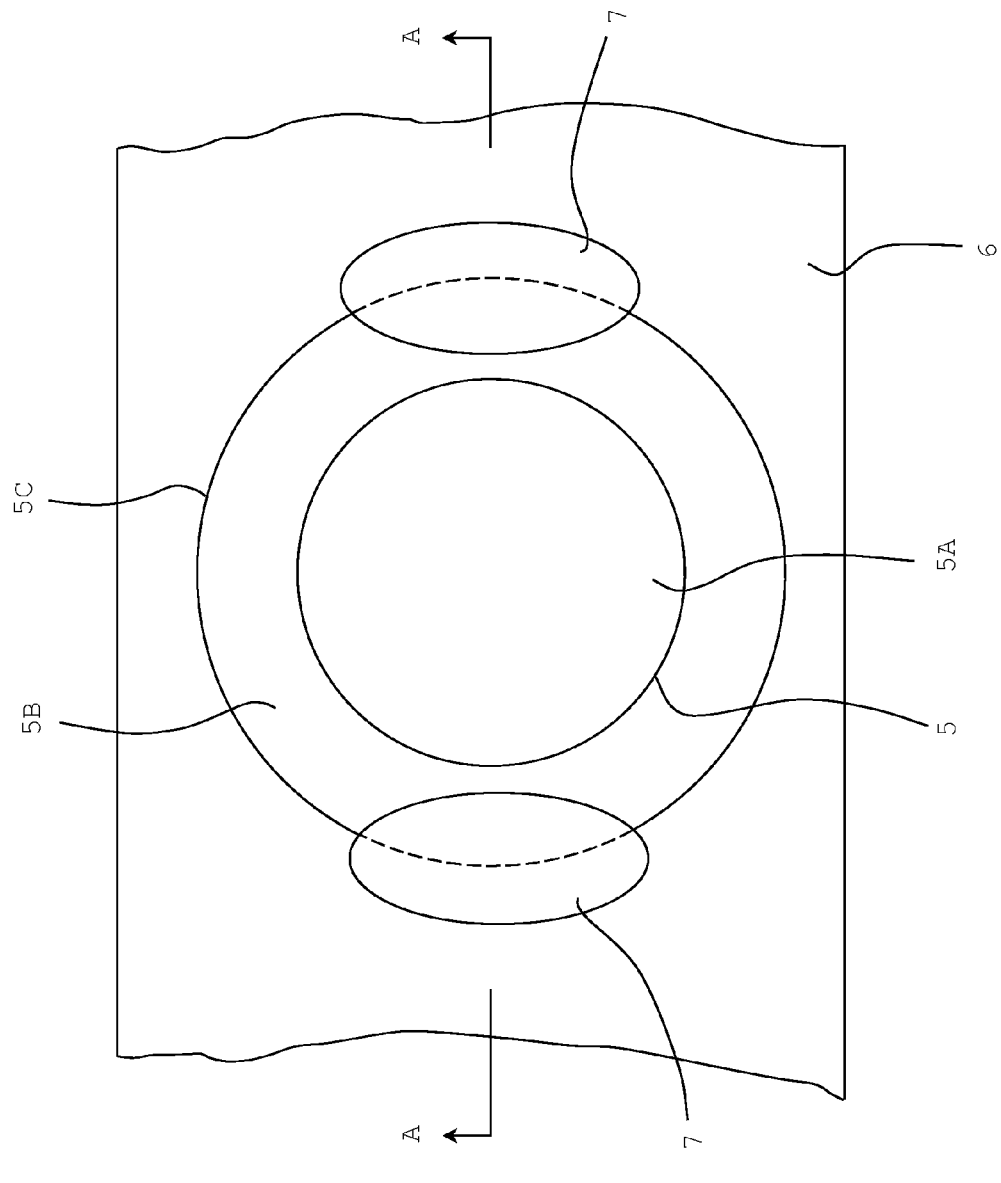
FIG. 8 is a plan view for showing an arrangement of a lens according to a comparative example.

FIG. 8 is a plan view for showing relationships between the objective lens and a lens holder according to the comparative example, and FIG. 9A is a cross-sectional view taken along line A-A in FIG. 8. FIG. 9B is a partial enlarged diagram of a portion indicated by a broken line circle in FIG. 9A.

In FIGS. 8 and 9A, reference numeral 5 is an objective lens. The objective lens 5 condenses laser light emitted from a laser diode onto a signal recording layer of an optical disc. The objective lens 5 has a lens portion 5A for condensing the laser light and a flange portion 5C formed in the periphery of the lens portion 5A. The flange portion 5C functions as a reflecting flat portion 5B for reflecting the parallel light L emitted from the auto collimator device 1 toward the auto collimator device 1.

Reference numeral 6 is a lens holder. The lens holder 6 is supported by four support wires (not shown) to be displaced in a focus direction and a tracking direction. The lens holder 6 is formed with an objective lens fixing portion 6A for mounting an under surface 5D of the flange portion 5C of the objective lens 5 thereon, as shown in FIG. 9A.

The under surface 5D of the flange portion 5C is configured to contact with the objective lens fixing portion 6A formed on the lens holder 6 and to define a fixing position of the objective lens 5 on the lens holder 6. As shown in FIG. 9B, corner portions between the objective lens fixing portion 6A and side wall portions contiguous thereto are rounded, and the corner portions are contacted with corner portions between the under surface 5D of the flange portion 5C and side wall portions contiguous thereto. With this arrangement, the objective lens 5 can be slightly inclined in any direction in a state that the under surface 5D of the flange portion 5C of the objective lens 5 is mounted on the corner portions of the objective lens fixing portion 6A. The objective lens 5 is adhered and fixedly attached to the lens holder 6 with an adhesive 7. As the adhesive 7, a UV curable adhesive, which is cured with irradiation of UV light, is generally utilized.

Further, the auto collimator device 1 shown in FIG. 5 is used to fix the objective lens 5 at an optimum position of the lens holder 6, i.e., a position in which the optical axis of the objective lens 5 is optimum with respect to the signal plane of the optical disc. Specifically, the reflecting flat portion 5B formed on the flange portion 5C of the objective lens 5 is irradiated with the parallel light L emitted from the auto collimator device 1, and the parallel light L reflected on the reflecting flat portion 5B is received at a light receiving portion of the auto collimator device 1. By checking the light reception state in receiving the light on the display portion 4A, workers can recognize and adjust a tilt of the objective lens 5.

The auto collimator device 1 generates a detection signal based on the parallel light which is reflected on the reflecting flat portion 5B of the flange portion 5C of the objective lens 5 and entered to the light receiving portion, and outputs the detection signal to the computing device 4. The computing device 4 performs an arithmetic process based on the inputted signals, and displays measurement data based on the result of the arithmetic process on the display portion 4A.

Figure 6:
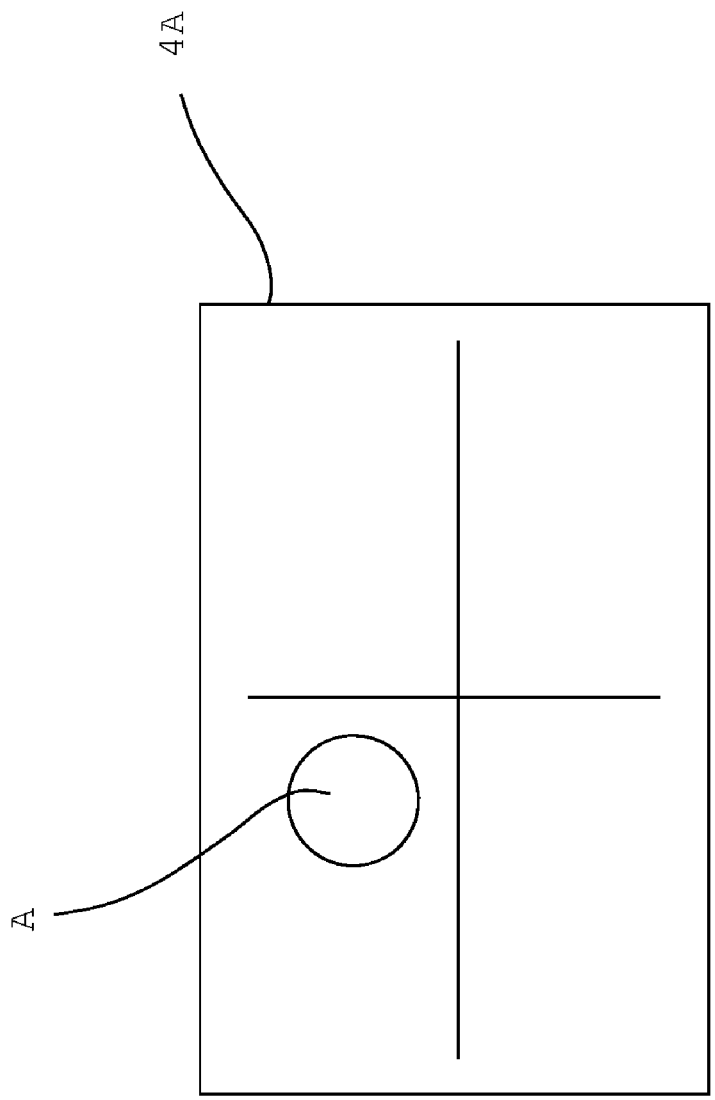
FIG. 6 is a diagram for showing a display of a display portion constituting the auto collimator device.

The measurement data obtained in such a manner is displayed on the display portion 4A as a point image A as shown, e.g., in FIG. 6. The point image A is obtained based on the parallel light L which is reflected on the reflecting flat portion 5B of the objective lens 5. Workers can recognize a deviation amount in mounted angle and a mounted direction of the objective lens 5 on the lens holder 6 based on the position of the point image A. Thus, by adjusting the angle of the objective lens 5 in such a manner that the point image A displayed on the display portion 4A is moved to such a position that the point image A coincides with the intersection point of two straight lines shown in e.g. FIG. 6, the angle of the objective lens 5 can be adjusted to be an optimum angle with respect to the lens holder 6.

The aforementioned position adjustment operation is performed in a state that the adhesive 7 has not been cured, i.e., the adhesive 7 has not been irradiated with UV light. After the mounting angle of the objective lens 5 is adjusted to be an optimum angle by the adjustment operation, the adhesive 7 is irradiated with UV light and the adhesive 7 is cured. By performing the aforementioned adhesion operation, the objective lens 5 is fixedly attached to the lens holder 6.

Example

Next, the following is a description of an arrangement of a lens and a method for mounting the lens in an example, referring to FIGS. 1 through 4.

Figure 1:
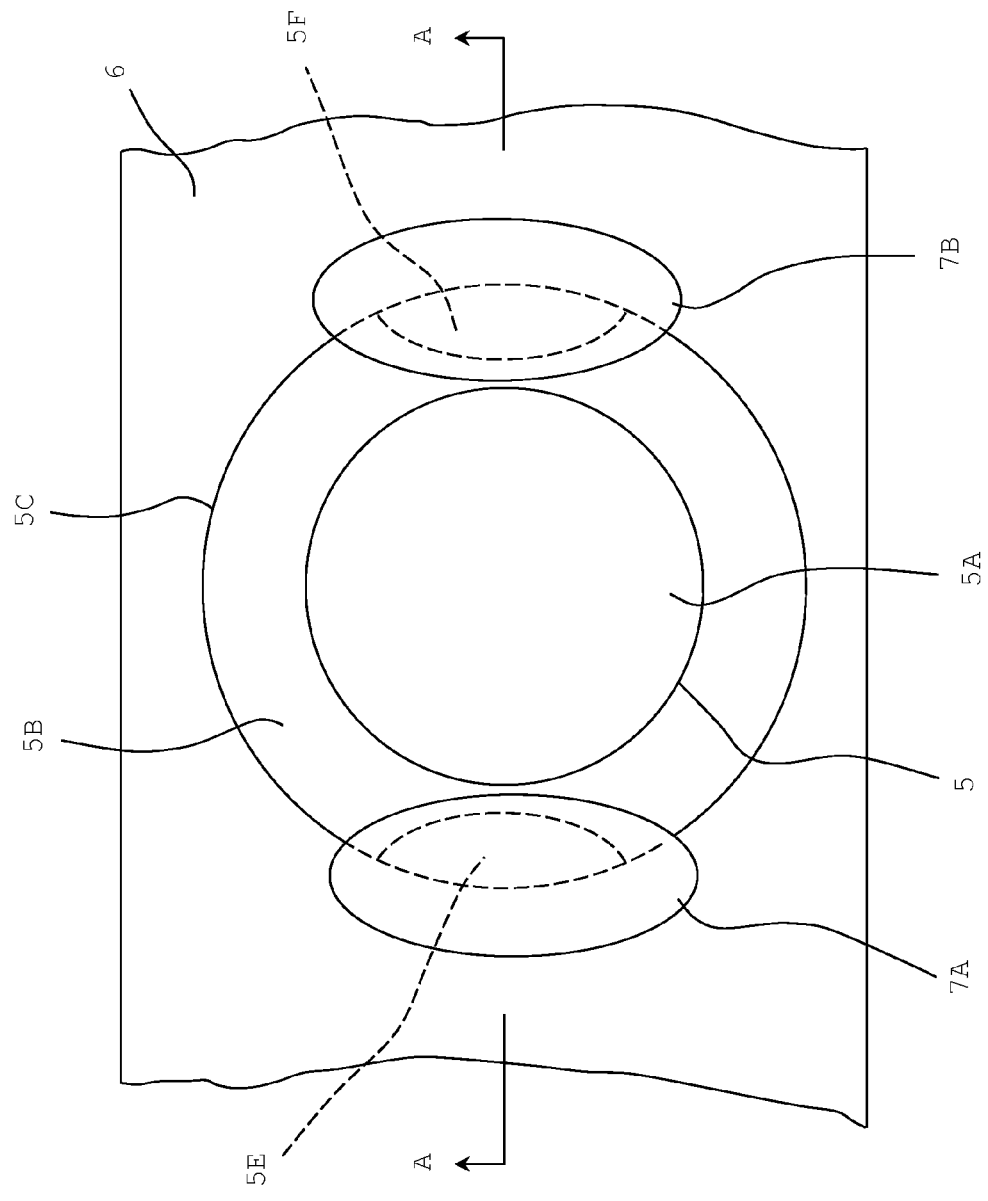
FIG. 1 is a plan view for showing an arrangement of a lens according to the present invention.
Figure 2:
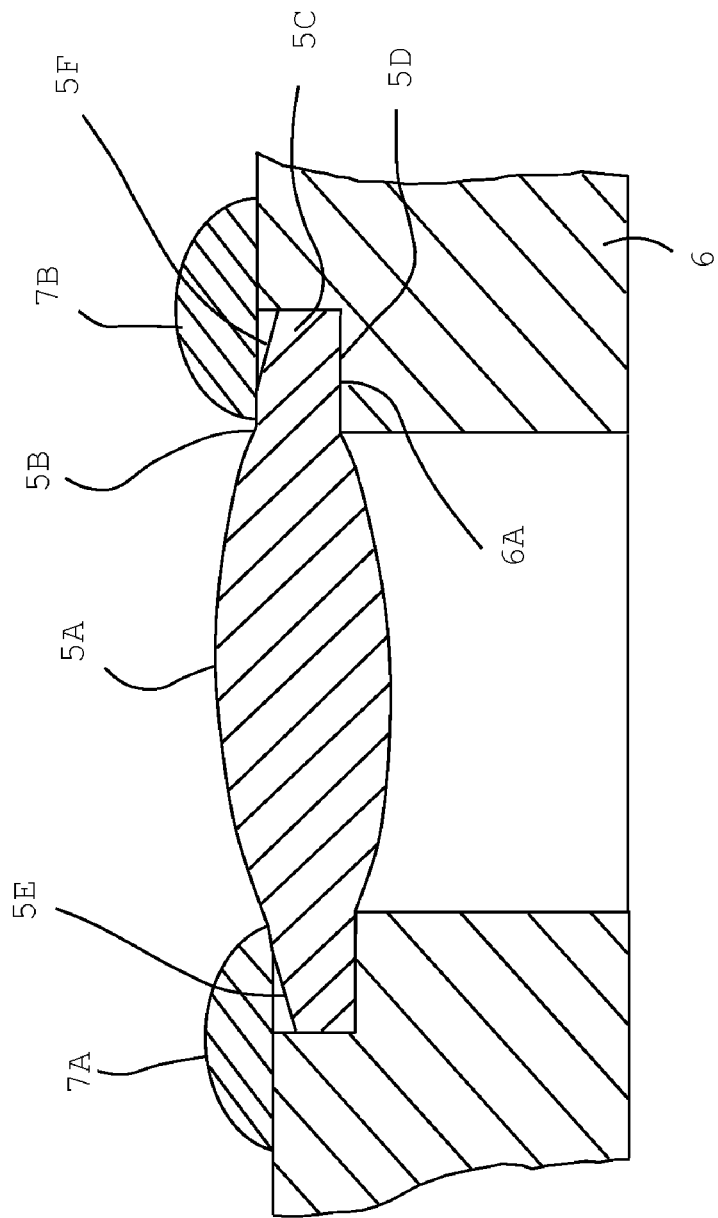
FIG. 2 is a cross-sectional view for showing an arrangement of the lens according to the present invention.

FIG. 1 is a plan view for showing an arrangement of a lens according to the example, and FIG. 2 is an A-A cross-sectional view of the lens shown in FIG. 1. An objective lens 5 according to the example has a feature that applied portions 5E and 5F of adhesives 7A and 7B, which are formed on a flange portion 5C of the objective lens 5 are inclined with respect to a reflecting flat portion 5B as shown in the cross-sectional view of FIG. 2.

An adhesive fixing operation of the objective lens 5 having the above arrangement to a lens holder 6 is performed after the angle adjustment operation of the objective lens 5 is performed using an auto collimator device 1, as described above.

The reflecting flat portion 5B of the flange portion 5C of the objective lens 5 and the applied portions 5E and 5F of the adhesives 7A and 7B are irradiated with parallel light L emitted from the auto collimator device 1. In the case where the adhesives 7A and 7B are accurately applied to the applied portions 5E and 5F, as shown in FIG. 1, the adhesives 7A and 7B coated over the applied portions 5E and 5F are irradiated with the parallel light L, but the parallel light L is not reflected on the applied portions 5E and 5F. Thus, by detecting presence or absence of the parallel light reflected on the applied portions 5E and 5F, it is possible to determine whether the application state, i.e., application amounts and positions, of the adhesives 7A and 7B to the applied portions 5E and 5F is proper or not.

When the parallel light L reflected on the applied portions 5E and 5F is configured to enter to the light receiving portion of the auto collimator device 1, it is possible to display, on the display portion 4A, the presence or absence of the parallel light L reflected on the applied portions 5E and 5F. With this arrangement, workers can determine whether the application state of the adhesives 7A and 7B to the applied portions 5E and 5F is proper or not by viewing a display on the display portion 4A.

FIG. 1 is a diagram showing a case where the application state i.e., application amounts and positions, of the adhesives 7A and 7B to the applied portions 5E and 5F is proper. In the proper state, since the applied portions 5E and 5F are not exposed, the parallel light L used for measurement which is emitted from the auto collimator device 1 is not reflected on the applied portions 5E and 5F. Thus, the parallel light L is reflected only on the reflecting flat portion 5B and the light reflected on the reflecting flat portion 5B is entered to the light receiving portion of the auto collimator device 1.

In the above case, the arithmetic process is performed by the computing device 4 based on a signal obtained from the light receiving portion, and the angular deviation amount and direction in mounting the objective lens 5 on the lens holder 6 is displayed on the display portion 4A as, e.g., a point image A shown in FIG. 6. Thus, workers can adjust the angle of the objective lens 5 in such a manner that the point image A is moved to such a position that the point image A coincides with the intersection point of the two straight lines. After the adjustment operation, workers are allowed to irradiate the adhesives 7A and 7B with UV light to cure the adhesives 7A and 7B. By performing the above operation, an adhesive fixing operation of the objective lens 5 to the lens holder 6 can be performed.

In the proper state, only the point image A which indicates the angle of the objective lens 5 with respect to the lens holder 6 is displayed on the display portion 4A, and a point image displayed based on the light reflected on the applied portions 5E and 5F is not displayed. Thus, workers can recognize the application state of the adhesives 7A and 7B to the applied portions 5E and 5F is proper by viewing the display.

The confirmation work of a proper application state of the adhesives 7A and 7B to the applied portions 5E and 5F is performed as described above. The following is a description of a case where the application state of the adhesives 7A and 7B to the applied portions 5E and 5F is not proper, referring to FIGS. 3, 4, and 7.

Figure 3:
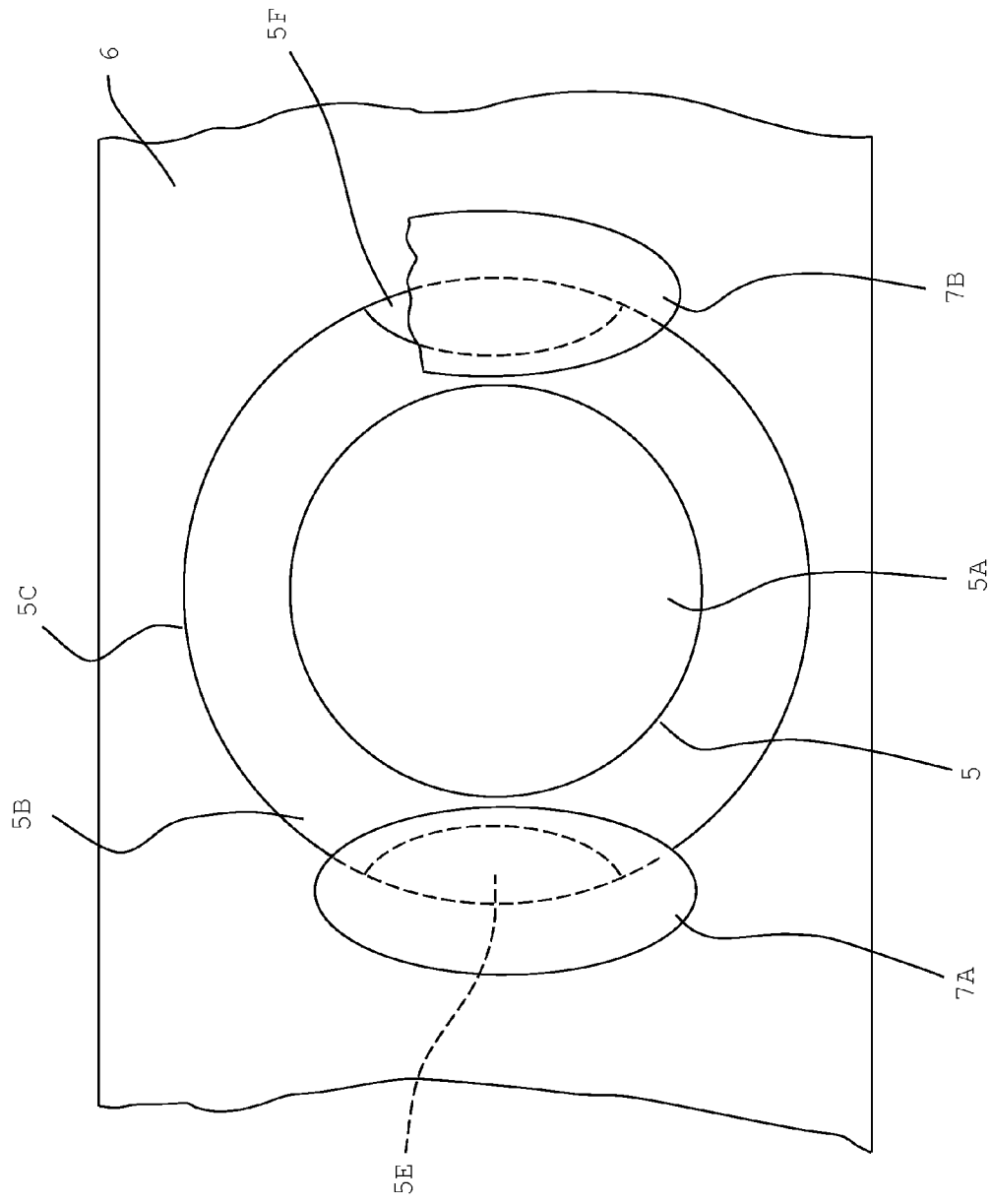
FIG. 3 is a plan view for showing an arrangement of the lens according to the present invention.

FIG. 3 shows a case where the application state of the adhesive 7B to the applied portion 5F is not proper. As is clear from FIG. 3, the application state shows that the application amount of the adhesive 7B is insufficient and a part of the applied portion 5F is exposed.

Figure 4:
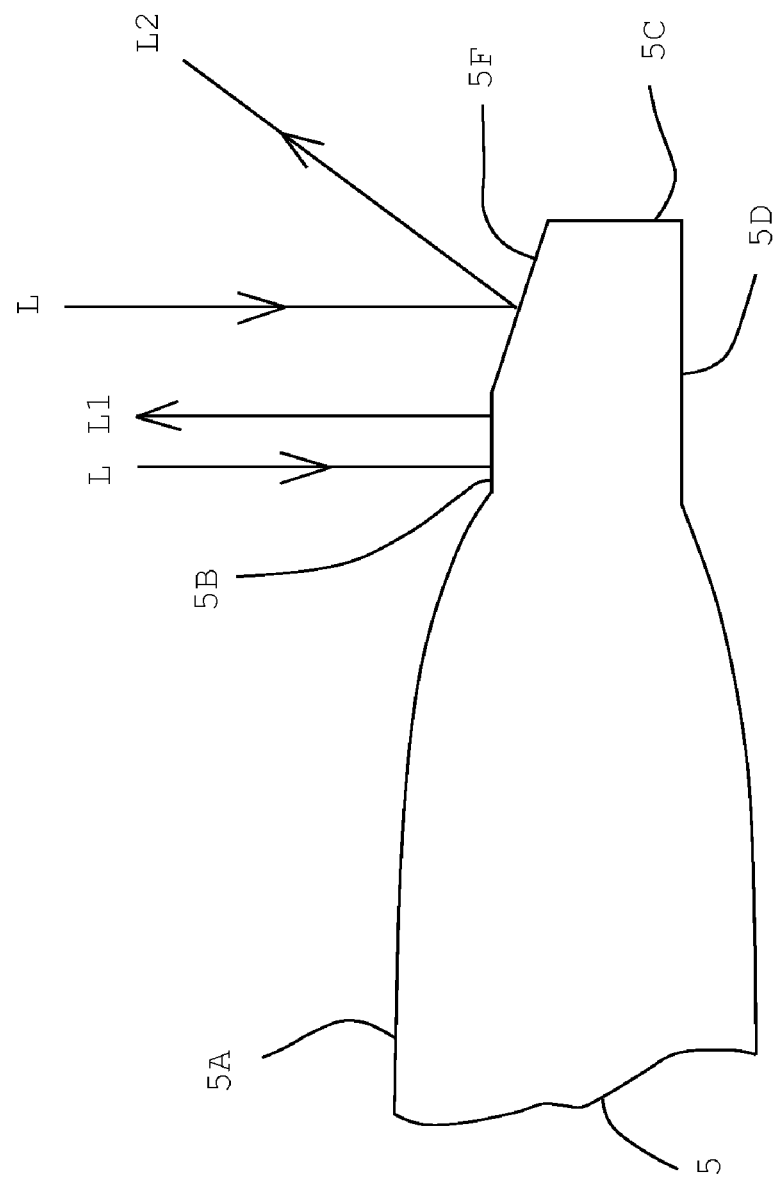
FIG. 4 is a plan view for showing an operation of the lens for reflecting parallel light according to the present invention.

In the improper state, as shown in FIG. 4, the reflecting flat portion 5B of the flange portion 5C of the objective lens 5 and the exposed part of the applied portion 5F are irradiated with the parallel light L emitted from the auto collimator device 1, and the parallel light L is reflected on each of the irradiated portions as reflection lights L1 and L2, respectively. Then, the reflection lights L1 and L2 are entered to the light receiving portion of the auto collimator device 1.

Figure 7:
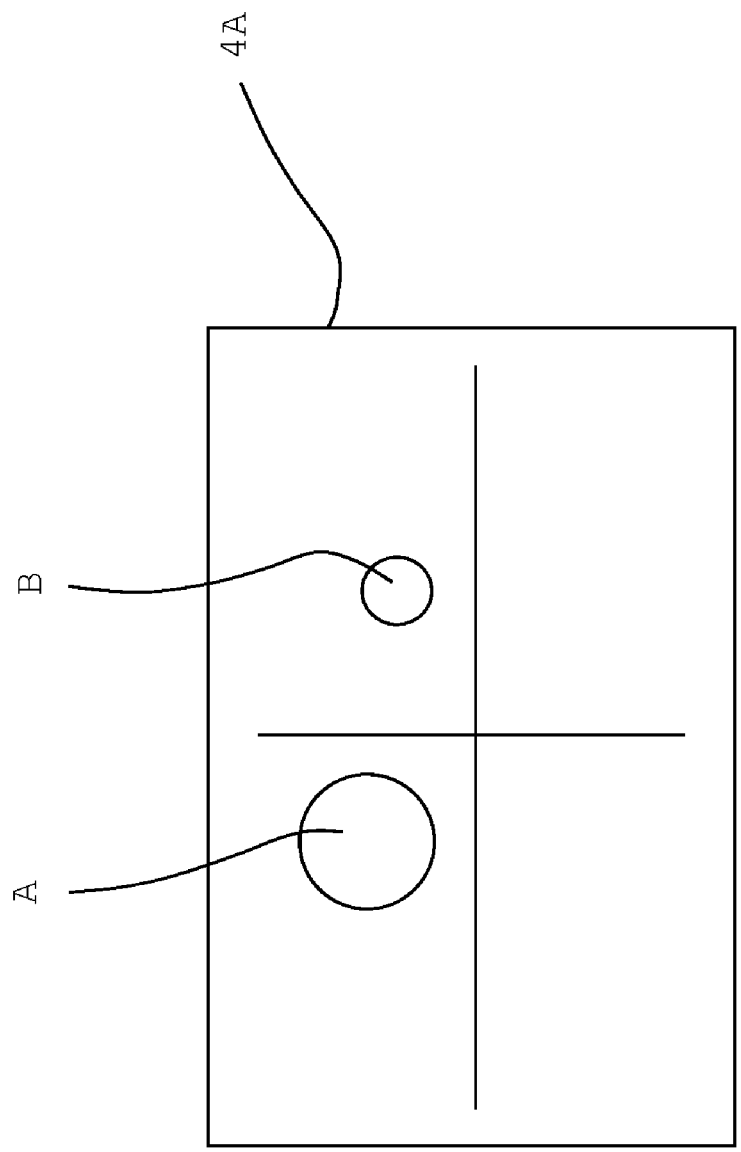
FIG. 7 is a diagram for showing a display of the display portion constituting the auto collimator device.

When the reflection light L1 reflected on the reflecting flat portion 5B and the reflection light L2 reflected on the applied portion 5F are entered to the light receiving portion of the auto collimator device 1, the arithmetic process is performed by the computing device 4, and, then, the point images A and B are displayed on the display portion 4A as shown in FIG. 7.

The point image A displayed on the display portion 4A is generated and displayed based on the reflection light L1 reflected on the reflecting flat portion 5B. Specifically, the point image A shows an angular deviation amount or the like of the objective lens 5 with respect to the lens holder 6. The angle of the objective lens 5 can be adjusted by moving the point image A to such a position that the point image A coincides with the intersection point of the two straight lines which are perpendicular to each other.

On the other hand, the point image B on the display portion 4A is generated and displayed based on the reflection light L2 reflected on the applied portion 5F. The point image B indicates that the application state of the adhesive 7B to the applied portion 5F is not proper. Specifically, in a case where the application amount and position of the adhesive 7B to the applied portion 5F are not proper, the point image B is displayed on the display portion 4A based on the reflection light L2 reflected on the applied portion 5F. Workers can easily recognize an improper application state of the adhesive 7B by viewing the display.

The above description explains a case where the application state of the adhesive 7B to the applied portion 5F is not proper, referring to FIG. 3. In a case where the application state of the adhesive 7A to the applied portion 5E is not proper, a point image based on the applied portion 5E is displayed in e.g. a quadrant where the point image A is displayed in FIG. 7.

As described above, in the present example, the position adjustment in mounting the objective lens 5 is performed, by using the display image A to be displayed on the display portion 4A to show a mounted angle of the objective lens 5 with respect to the lens holder 6. At the same time, workers can easily determine whether the application state of adhesive is proper by checking whether there is another point image on the display portion 4A.

In the present example, it is possible to change or modify the angle, direction and etc. of the tilt of the applied portion of adhesive, which is formed on the flange portion, in various ways as necessary. Further, in the present example, the reflecting flat portion for adjusting the tilt of the objective lens is formed on the flange portion. Alternatively, the reflecting flat portion may be formed at a portion other than the above.

Furthermore, in the present example, an objective lens used for an optical pickup device has been described. The present invention may be applied not only to a lens such as a collimator lens or a sensor lens used for an optical pickup device but also to a lens used for optical devices such as a camera.

Specific Configuration Examples

A more specific configuration example in the case where the present invention is applied to an objective lens mounted in an optical pickup device and a mounting method thereof is explained below. The optical pickup device according to the configuration example relates to an optical pickup device compatible with CD, DVD and BD (Blu-ray disc).

It is noted that the objective lens according to the configuration example corresponds to a lens according to one of claims 1 to 6, the lens mounting method according to the configuration example corresponds to a method for mounting a lens according to one of claims 8 to 11, the optical pickup device according to the configuration example corresponds to an optical pickup device according to claim 11. However, the present invention is not limited to the configuration example.

Figure 10B:
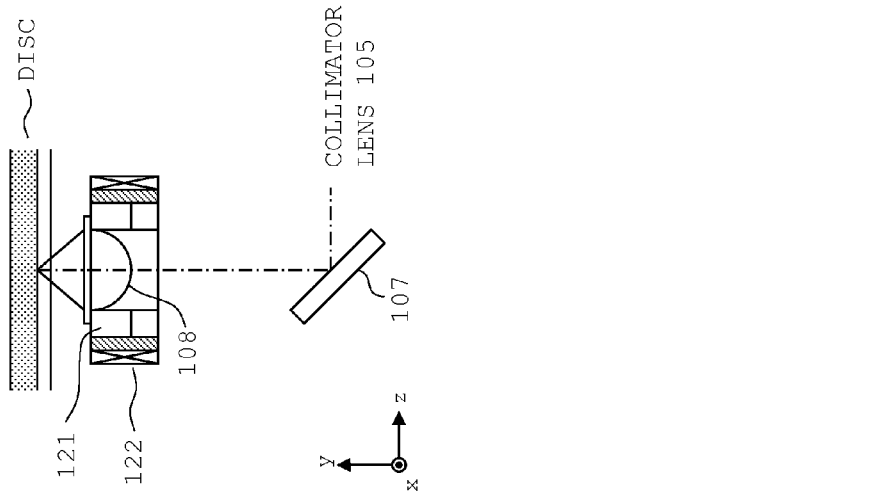
FIGS. 10A and 10B are diagrams showing an arrangement of an optical system in an optical pickup device according to a configuration example.
Figure 10A:
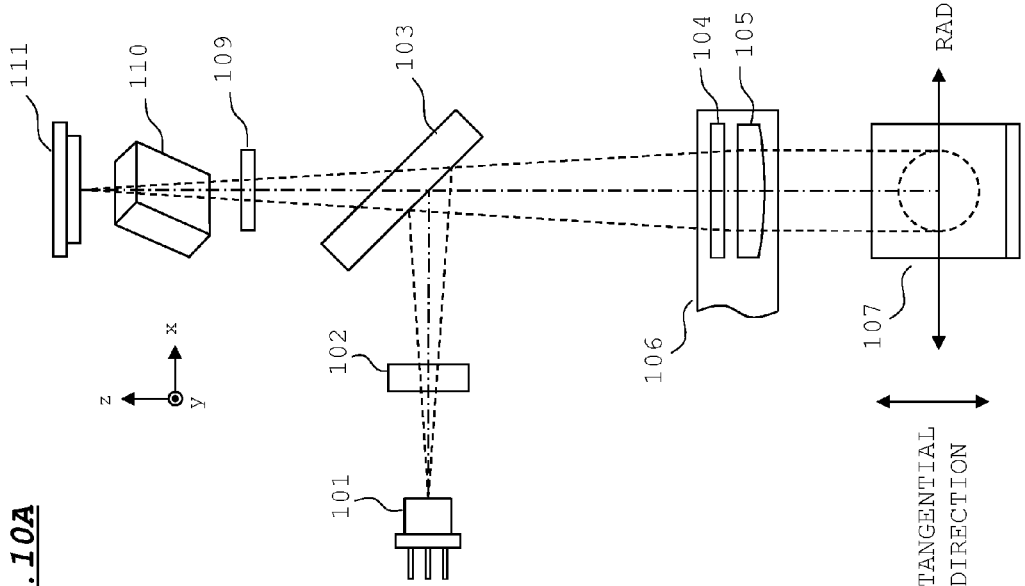

FIGS. 10A and 10B show an optical system of an optical pickup device 3 according to the configuration example. FIG. 10A is a plan view of an optical system of the optical pickup device 3 when viewed from the upper side (in minus y-axis direction), and FIG. 10B is a perspective side view of a peripheral portion of an objective lens actuator 122.

Referring to FIG. 10A, the optical pickup device 3 is provided with a laser diode 101, a grating 102, a PBS (Polarizing Beam Splitter) plate 103, a ¼ wavelength plate 104, a collimator lens 105, a lens actuator 106, a rise-up mirror 107, an objective lens 108, a diffractive optical element (DOE) 109, an astigmatism plate 110 and a photodetector 111.

The laser diode 101 emits laser light (hereinafter, called as "BD light") having a wavelength of or about 400 nm, laser light (hereinafter, called as "DVD light") having a wavelength of or about 650 nm, and laser light (hereinafter, called as "CD light") having a wavelength of or about 780 nm in one direction (plus x-axis direction).

The grating 102 divides BD light, among BD light, DVD light and CD light emitted from the laser diode 101, into a maim beam and two sub beams. In the grating 102, diffraction grooves are formed in such a manner that the three beams of the BD light are aligned along a track of an optical disc. Although DVD light and CD light also receive a diffractive action of the grating 102, light intensities of sub beams of these light are exceedingly small.

The PBS plate 103 reflects the laser light incident from the side of the grating 102. The PBS plate 103 is formed with a parallel plate whose light entering surface and light outgoing surface each have a square contour. A polarization film is formed on the light entering surface of the PBS plate 103. The laser diode 101 is arranged at such a position that polarization directions of BD light, DVD light and CD light coincide with the polarization direction of s-polarized light with respect to the PBS plate 103.

The ¼ wavelength plate 104 converts the laser light reflected on the PBS plate 103 into circular polarized light, and converts reflected light from the disc into linear polarized light having a polarization direction perpendicularly intersecting the polarization direction of laser light toward the disc. Thereby, the laser light reflected on the disc is transmitted through the PBS plate 103 and guided to the photodetector 111.

The collimator lens 105 converts the laser light reflected on the PBS plate 103 into parallel light. The lens actuator 106 moves the ¼ wavelength plate 104 and the collimator lens 105 in a direction of the optical axis of the collimator lens 105. An aberration generated in the laser light is corrected by moving the collimator lens 105. The rise-up mirror 107 reflects the laser light incident from the side of the collimator lens 105 in a direction (plus y-axis direction) toward the objective lens 108.

The objective lens 108 is so configured as to properly focus BD light, DVD light and CD light on the corresponding discs. The objective lens 108 is held on a holder 121, and the holder 121 is driven in a focus direction (y-axis direction) and a tracking direction (a radial direction of the disc) by the objective lens actuator 122.

In the configuration example, the objective lens 108 corresponds to a lens recited in claim 1, and the holder 121 corresponds to a lens holder recited in claim 1. Configurations on the objective lens 108 and the holder 121 are explained later referring to FIGS. 11A to 11D and FIGS. 13A to 13D.

The reflected light form the disc is converted into the linear polarized light, which serves as p-polarized light with respect to the PBS plate 103, by the ¼ wavelength plate 104. Thereby, the reflected light from the disc is transmitted through the PBS plate 103.

The DOE 109 is a wavelength selective grating which changes a traveling direction of BD light mainly by a diffractive action. Plus first order diffracted light of BD light diffracted by the DOE 109 is directed in a direction close to the optical axis of DVD light. Thereby, the optical axis of the main beam of BD light is coincident with the optical axis of DVD light on a light receiving surface of the photodetector 111.

The astigmatism plate 110 is a parallel plate, which provides astigmatism to BD light, DVD light and CD light. A thickness, a refractive index and a tilt direction of the astigmatism plate 110 are adjusted in such a manner that a proper astigmatism is provided to each light by the astigmatism of the astigmatism plate 110 and the astigmatism to be provided by the PBS plate 103. Quadrant sensors are arranged at irradiation positions of BD light, DVD light and CD light, on the light receiving surface of the photodetector 111. The main beam of BD light is received by the quadrant sensor which receives the DVD light.

Figure 11A:
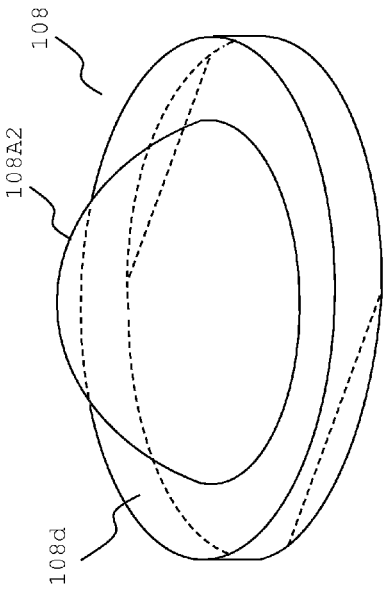
FIGS. 11A through 11D are diagrams showing an arrangement of an objective lens according to the configuration example.
Figure 11B:
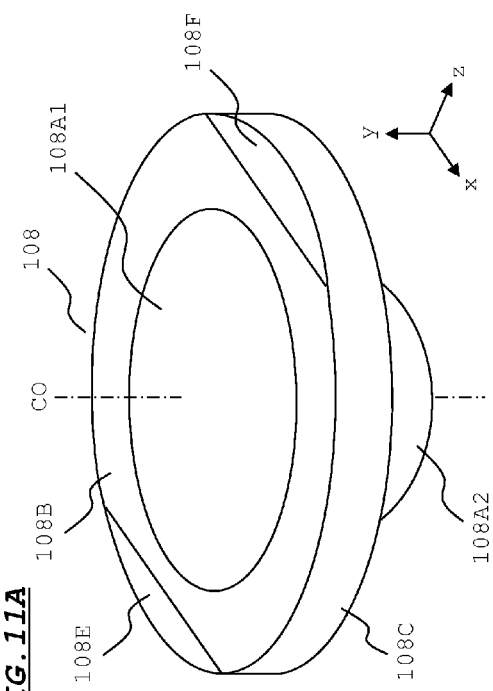
Figure 11C:
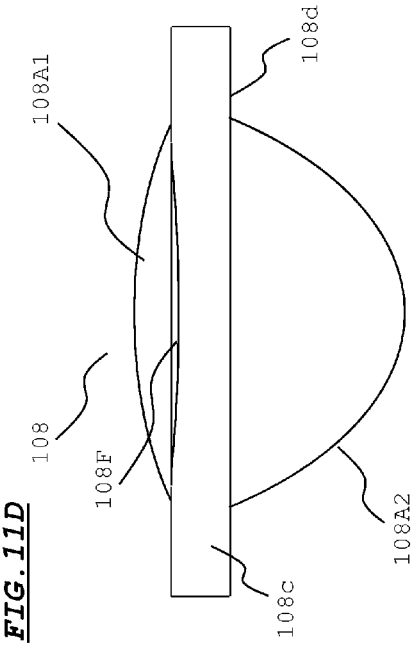
Figure 11D:
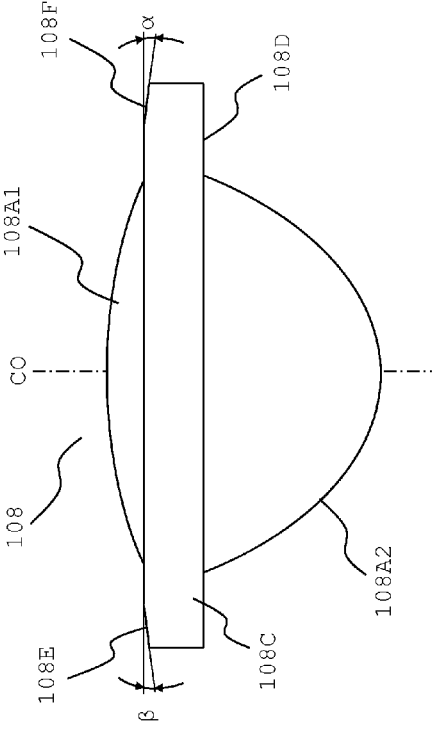

FIGS. 11A through 11D are diagrams showing an arrangement of the objective lens 108. FIG. 11A is a perspective view of the objective lens 108 when viewed from the upper side, FIG. 11B is a perspective view of the objective lens 108, in the case where the objective lens 108 is inverted upside down from the state shown in the top side view of FIG. 11A, and FIGS. 11C and 11D are respectively side views of the objective lens 108 when viewed from minus x-axis direction and minus z-axis direction.

Referring to FIG. 11A, the objective lens 108 is provided with a lens surface 108A1, a lens surface 108A2, a reflecting flat portion 108B, a flange portion 108C, an under surface 108D, an applied portion 108E, and an applied portion 108F.

The lens surfaces 108A1 and 108A2 correspond to the lens portion 5A shown in the example, the reflecting flat portion 108B corresponds to the reflecting flat portion 5B shown in the example, the flange portion 108C corresponds to the flange portion 5C shown in the example, the under surface 108D corresponds to the under surface 5D shown in the example, and the applied portions 108E and 108F respectively correspond to the applied portions 5E and 5F in the example.

The lens surfaces 108A1 and 108A2 are configured to focus BD light, DVD light and CD light on the corresponding discs. The lens surfaces 108A1 and 108A2 are aspherical convex surfaces. The lens surface 108A2 has a diffractive structure for adjusting an astigmatism generated in each light, a focal position or the like. The diameter of the lens surface 108A2 is set larger than the diameter of the lens surface 108A1. The optical axes of the lens surfaces 108A1 and 108A2 coincide with an optical axis CO of the objective lens 108. In FIG. 11A, the optical axis CO is in parallel to y-axis.

The flange portion 108C having a predetermined thickness is formed in an annular shape in the periphery of the lens surfaces 108A1 and 108A2 and coaxially with the optical axis CO. The diameter of the flange portion 108C is constant to a position corresponding to an outer circumferential surface of the flange portion 108C. Further, the thickness of the flange portion 108C is also constant to the position corresponding to the outer circumferential surface of the flange portion 108C.

An upper surface of the flange portion 108C is a surface (a plane perpendicular to the optical axis CO) in parallel to x-z plane, and serves as the reflecting flat portion 108B. As will be described later, the reflecting flat portion 108B is used for adjusting a tilt of the objective lens 108. In view of this, it is desirable to enhance the surface precision by e.g. processing a portion of a die corresponding to the reflecting flat portion 108B into a mirror-like surface. Further, the under surface 108D (see FIG. 11B) of the flange portion 108C is a surface (a plane perpendicular to the optical axis CO) in parallel to x-z plane, as well as the reflecting flat portion 108B. Since the diameter of the lens surface 108A1 is set smaller than the diameter of the lens surface 108A2, the width of the reflecting flat portion 108B in the radial direction is set larger than the width of the under surface 108D in the radial direction.

The applied portions 108E and 108F are formed, on the upper surface of the flange portion 108C, at such positions that the applied portions 108E and 108F are angularly displaced from each other by 180 degrees around the optical axis. The applied portions 108E and 108F are respectively flat surfaces which are inclined with respect to the reflecting flat portion 108B by predetermined angles in minus y-axis direction. Specifically, the applied portions 108E and 108F have such shapes that the reflecting flat portion 108B is cut away by planes which are inclined with respect to the reflecting flat portion 108B by angles α and β in minus y-axis direction (a direction in parallel to y-z plane). In the configuration example, the tilt angles α and β (see FIG. 11C) of the applied portions 108E and 108F with respect to the reflecting flat portion 108B are equal to each other. Further, the applied portions 108E and 108F have shapes and areas substantially the same as each other, when viewed in minus y-axis direction, and are symmetrical to each other with respect to the optical axis CO.

As will be described later, the applied portions 108E and 108F are used for checking an application state of an adhesive to the objective lens 108. In view of the above, it is desirable to enhance the surface precision by processing portions of a die corresponding to the applied portions 108E and 108F into a mirror-like surface. Further, in the configuration example, the tilt angles α and β of the applied portions 108E and 108F are made to be equal to each other. However, as far as it is possible to receive light reflected on the applied portions 108E, 108F by an imaging camera of an auto collimator device 1 to be described later, the tilt angles α and β may not be equal to each other. Specifically, the tilt angles α and β of the applied portions 108E and 108F determine a traveling direction of light reflected on the applied portions 108E and 108F. Accordingly, it is possible to set the tilt angles α and β of the applied portions 108E and 108F to any value in such a range that the light reflected on the applied portions 108E and 108F is allowed to be received by an imaging camera 204 (see FIG. 12A) of the auto collimator device 1.

FIG. 12A is a diagram showing an overall arrangement of the optical pickup device 3 and an arrangement of the auto collimator device 1.

The optical pickup device 3 is provided with a housing H for holding the optical system shown in FIGS. 10A and 10B. The housing H is formed with a guide hole H1, a guide groove H2, a recess H3, a support portion H4, and an opening H5. Support shafts SA and SB for supporting the housing H are received in the guide hole H1 and the guide groove H2. The recess H3 is formed by partitioning an under surface of the housing H by a wall. An optical system OS shown in FIG. 10A is mounted in the recess H3. The support portion H4 is formed to project from an upper surface of the housing H. The holder 121 is mounted on the support portion H4 via elastically deformable four support wires SW. The objective lens 108 is mounted on the holder 121. The opening H5 is adapted to guide BD light, DVD light and CD light from the optical system OS to the objective lens 108, and guide BD light, DVD light and CD light reflected on the corresponding discs from the objective lens 108 to the optical system OS.

A focus coil and a tracking coil are mounted on the holder 121, and magnets are disposed on the upper surface of the housing H in such a manner as to face the coils. The holder 121 is positioned at such a position that the weight of the holder 121 and an elastic restoring force by the support wires SW are balanced in a state that an electric current is not supplied to the focus coil. The holder 121 is moved in up and down directions (y-axis directions) while substantially keeping a posture thereof. When the holder 121 is moved in up and down directions (y-axis directions), the support wires SW are flexed in such a manner that the posture of the holder 121 is substantially kept.

FIGS. 13A through 13D are diagrams showing an arrangement of a portion (a mounting portion) of the holder 121, on which the objective lens 108 is mounted. FIG. 13A is a plan view showing a state before the objective lens 108 is mounted, FIG. 13B is a plan view showing a state after the objective lens 108 is mounted, and FIGS. 13C and 13D are respectively cross-sectional views taken along the line B-B in FIGS. 13A and 13B.

Referring to FIGS. 13A and 13C, the holder 121 is formed with an objective lens fixing portion 121A, an upper surface 121B, a hole 121C, a wall surface 121D and a curved surface portion 121E. The objective lens fixing portion 121A is a flat surface in parallel to x-z plane, and is located at a predetermined depth position from the upper surface 121B of the holder 121. The objective lens fixing portion 121A has an annular shape with a certain diameter, when viewed from the upper side (plus y-axis direction). The hole 121C in the shape of a circle is formed in the center of the objective lens fixing portion 121A for passing BD light, DVD light and CD light. The diameter of the hole 121C is set larger than the diameter of the lens surface 108A2. Further, the wall surface 121D continuing to the upper surface 121B is formed along an outer circumference of the objective lens fixing portion 121A. Further, the curved surface portion 121E having such a shape that corner portions between the wall surface 121D and the objective lens fixing portion 121A are rounded is formed in a boundary region between the wall surface 121D and the objective lens fixing portion 121A. A lower end of the wall surface 121D and a peripheral edge of the objective lens fixing portion 121A are continued to each other via the curved surface portion 121E.

The diameter of the outer circumference of the objective lens fixing portion 121A is set smaller than the diameter of the outer circumferential surface of the flange portion 108C of the objective lens 108, and the diameter of the wall surface 121D is set larger than the diameter of the outer circumferential surface of the flange portion 108C of the objective lens 108. With this arrangement, as shown in FIGS. 13B and 13D, when the objective lens 108 is mounted in the wall surface 121D, the under surface 108D of the flange portion 108C is placed on the curved surface portion 121E, and a gap is formed between the outer circumferential surface of the flange portion 108C and the wall surface 121D, and between the under surface 108D and the objective lens fixing portion 121A. This allows the objective lens 108 to swing, and allows workers to adjust a tilt of the objective lens 108. The tilt adjustment of the objective lens 108 is performed in the range of about ±0.2 degree.

Referring back to FIG. 12A, the auto collimator device 1 is provided with a laser light source 201, a half mirror 202, a collimator lens 203 and the imaging camera 204. The laser light source 201 emits laser light of a predetermined wavelength in minus z-axis direction. A half of the laser light emitted from the laser light source 201 is reflected on the half mirror 202 in minus y-axis direction. The reflected laser light is converted into parallel light L by the collimator lens 203. The parallel light L is irradiated onto the optical pickup device 3, as an object to be irradiated.

In adjusting the angle of the objective lens 108, the optical pickup device 3 is placed on a reference table 2 (see FIG. 5). The reference table 2 is provided with the support shafts SA and SB shown in FIG. 12A. By inserting the support shafts SA and SB respectively in the guide hole H1 and in the guide groove H2 of the housing H, the housing H is supported horizontally (i.e. in a direction in parallel to x-z plane). Further, by engaging a member for restricting movement of the housing H along the support shafts SA and SB with the housing H, the housing H is fixed at a predetermined position. The optical axis of the parallel light L to be emitted from the auto collimator device 1 is aligned at a position near the center of the objective lens 108 in the above state.

The light reflected on the objective lens 108 is entered to the half mirror 202 via the collimator lens 203. A half of the reflected light is transmitted through the half mirror 202, and is condensed on an imaging plane P (see FIG. 14A) of the imaging camera 204. The imaging camera 204 is disposed at such a position that the distance between the imaging plane P and the collimator lens 203 coincides with the focal distance of the collimator lens 203. The imaging plane P is disposed perpendicularly to y-axis direction. Further, the optical axis of the imaging camera 204 coincides with the optical axis of the collimator lens 203.

FIG. 12B is a flowchart showing a process of mounting the objective lens 108 on the holder 121. In the following, a method for mounting the objective lens 108 on the holder 121 is described referring to FIG. 12B and FIGS. 14A through 17C.

FIGS. 14A, 15A, 16A and 17A are diagrams schematically showing the parallel light L to be emitted from the auto collimator device 1, and optical paths of reflection lights L1 and L2 from the objective lens 108 in corresponding steps. To simplify the description, in FIGS. 14A, 15A, 16A and 17A, the illustration of the laser light source 201 and the half mirror 202 is omitted, and an image sensor 204a included in the imaging camera 204 is shown in place of the imaging camera 204. FIGS. 14B, 15B, 16B and 17B are diagrams schematically showing an image to be displayed on the display portion 4A in the corresponding steps. FIGS. 14C, 15C, 16C and 17C are diagrams schematically showing a mounted state of the objective lens 108 on the holder 121 in the corresponding steps.

Referring to FIG. 12B, in the process of mounting the objective lens 108, firstly, as described above, the optical pickup device 3 is placed on the reference table 2 (S101). As shown in FIG. 14C (as well as in FIGS. 13B and 13D), in this state, the objective lens 108 is mounted in the wall surface 121D of the holder 121. Then, the laser light source 201 is turned on, and the objective lens 108 is irradiated with the parallel light L (S102). At the irradiation, the parallel light L is irradiated in an area slightly larger than the outer circumference of the flange portion 108C of the objective lens 108.

Figure 14B:
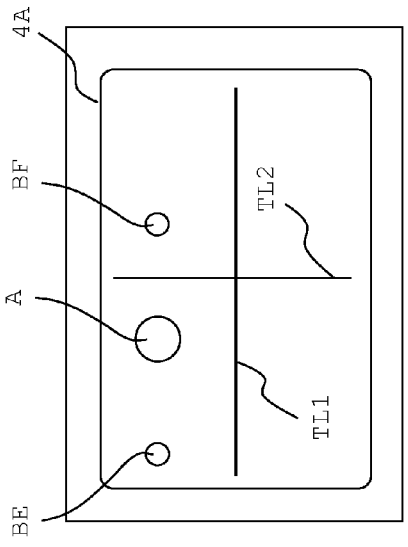
FIGS. 14A through 14C are diagrams respectively exemplifying a state of light, a state of a screen to be displayed on a display portion and a mounted state of the objective lens on the holder in the objective lens mounting process according to the configuration example.
Figure 14C:
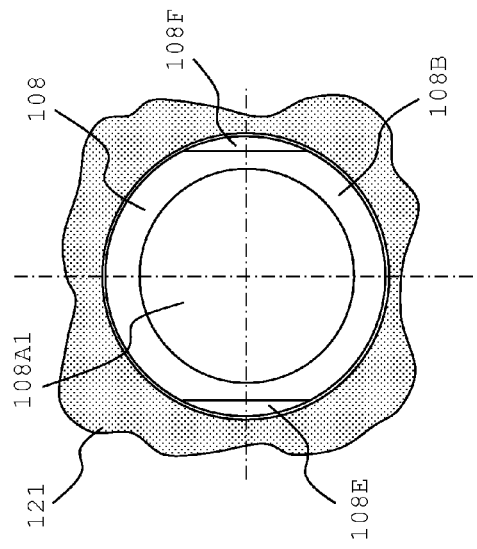
Figure 14A:
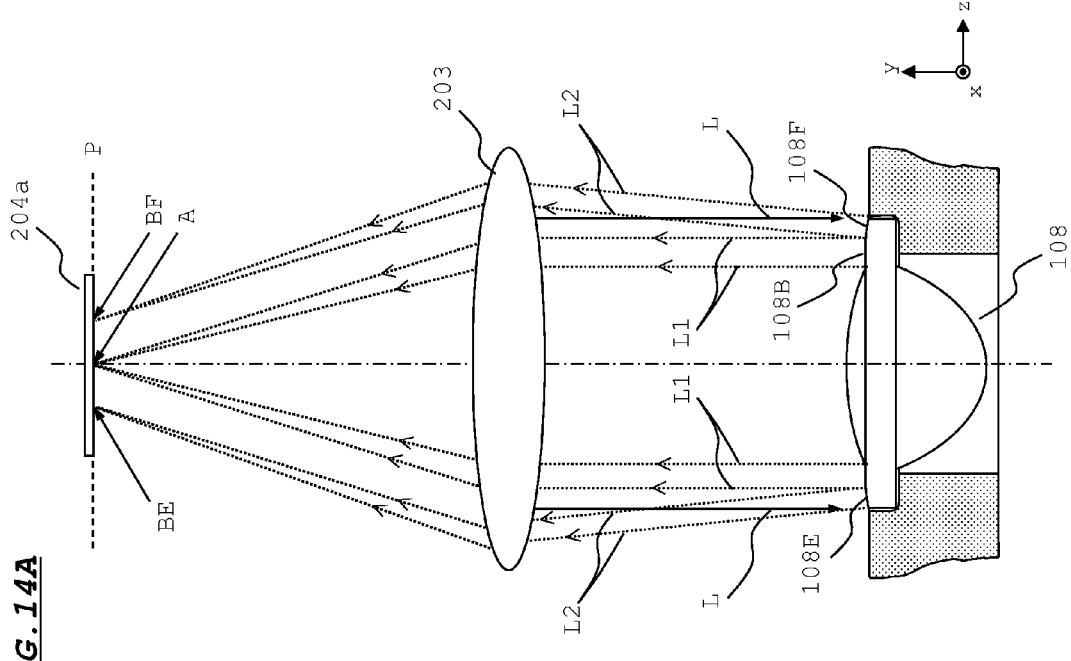

FIG. 14A is a diagram showing states of the parallel light L and the reflection lights L1 and L2 in the above condition. The parallel light L is reflected on the reflecting flat portion 108B, and the applied portions 108E and 108F on the upper surface of the objective lens 108. The reflection light L1 reflected on the reflecting flat portion 108B, and the reflection light L2 reflected on the applied portions 108E and 108F are condensed on the imaging plane P of the image sensor 204a. At the condensation, since the applied portions 108E and 108F are inclined with respect to the reflecting flat portion 108B in minus y-axis direction, the two beams of the reflection light L2 are gradually away from the reflection light L1. As a result, condensing positions of the two beams of the reflection light L2 are away from a condensing position of the reflection light L1, on the imaging plane P.

Accordingly, for instance, an image as shown in FIG. 14B is displayed on the display portion 4A. In FIG. 14B, a point image A indicates a light condensing area of the reflection light L1 from the reflecting flat portion 108B, on the imaging plane P, and point images BE and BF respectively indicate light condensing areas of the reflection light L2 from the applied portions 108E and 108F, on the imaging plane P. In a state that adhesives 7A and 7B are not coated on the applied portions 108E and 108F, the point images BE and BF are displayed on a screen, in addition to the point image A.

In the case where the surface precision of the reflecting flat portion 108B is as high as that of a mirror-like surface, as shown in FIG. 14A, the reflection light L1 is condensed at one point. Actually, however, since some extent of undulation is formed on the reflecting flat portion 108B, the reflection light L1 is condensed on a slightly larger area than a point area.

Accordingly, the point image A is formed in the shape of a spot. Likewise, the point images BE and BF are formed in the shape of a spot. Since the areas of the applied portions 108E and 108F are small, as compared with the area of the reflecting flat portion 108B, the reflection light L2 from the applied portions 108E and 108F is likely to be condensed, as compared with the reflection light L1 from the reflecting flat portion 108B. Accordingly, the point images BE and BF are small as compared with the point image A.

In FIG. 14B, the entire screen to be displayed on the display portion 4A corresponds to an imaging area of the image sensor 204a. Further, two straight lines TL1 and TL2 perpendicularly intersecting with each other are displayed on the screen, as an index for angle adjustment. The intersection point of the straight lines TL1 and TL2 corresponds to the center of the imaging area of the image sensor 204a. Further, the straight line TL2 is aligned with z-axis direction.

Referring back to FIG. 12B, after the parallel light L is irradiated onto the objective lens 108, the adhesives 7A and 7B of UV curable type are respectively coated on the applied portions 108E and 108F (S103). The coating is performed by e.g. ejecting a predetermined amount of adhesive through a needle tip.

Figure 15B:
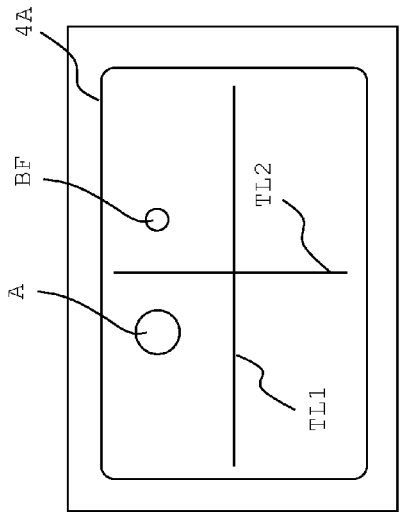
FIGS. 15A through 15C are diagrams respectively exemplifying a state of light, a state of a screen to be displayed on the display portion and a mounted state of the objective lens on the holder in the objective lens mounting process according to the configuration example.
Figure 15C:
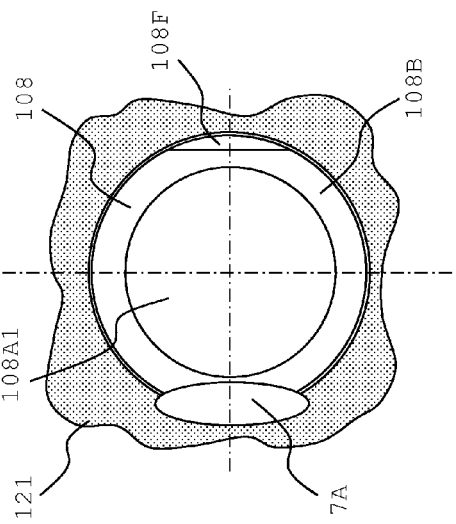
Figure 15A:
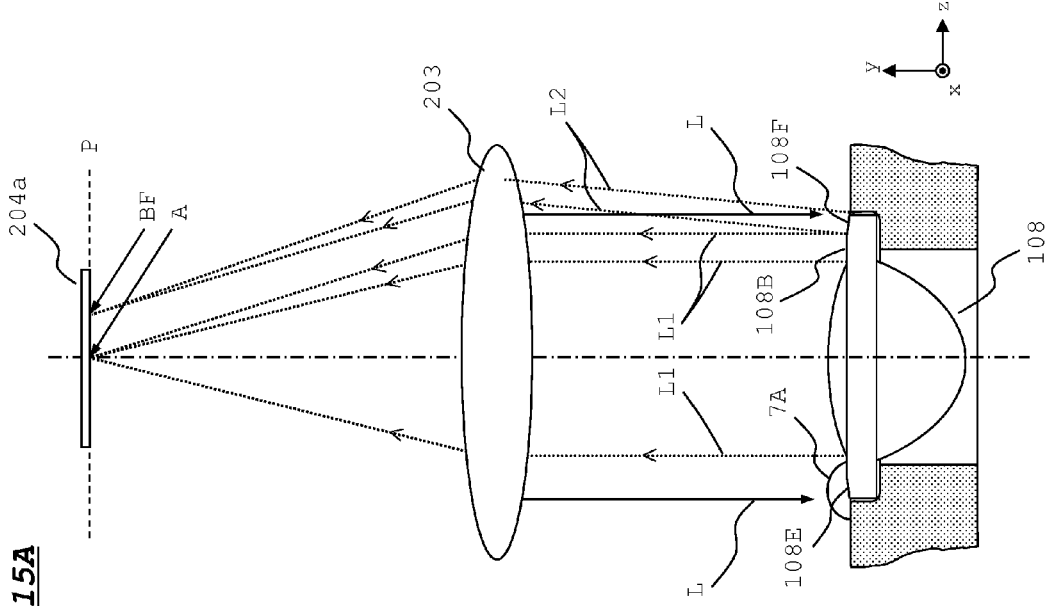

FIG. 15A is a diagram showing a state of each light in the case where the adhesive 7A is properly coated on the applied portion 108E. In this case, since there is no reflection light L2 from the applied portion 108E, the point image BE disappears from the screen on the display portion 4A. Since the parallel light L causes multiple reflections by the adhesive 7A, reflected light from the adhesive 7A is not condensed on the image sensor 204a.

Figure 16B:
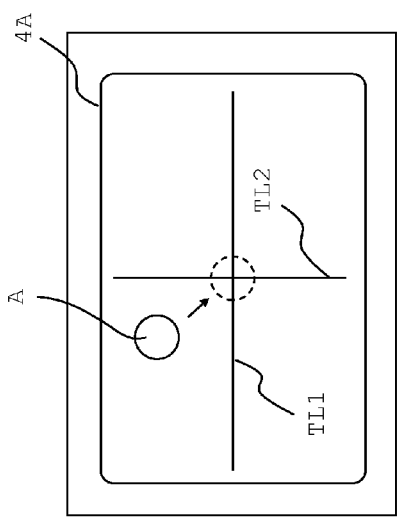
FIGS. 16A through 16C are diagrams respectively exemplifying a state of light, a state of a screen to be displayed on the display portion and a mounted state of the objective lens on the holder in the objective lens mounting process according to the configuration example.
Figure 16C:
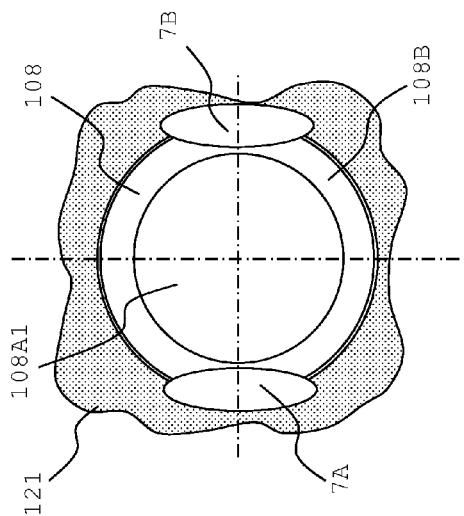
Figure 16A:
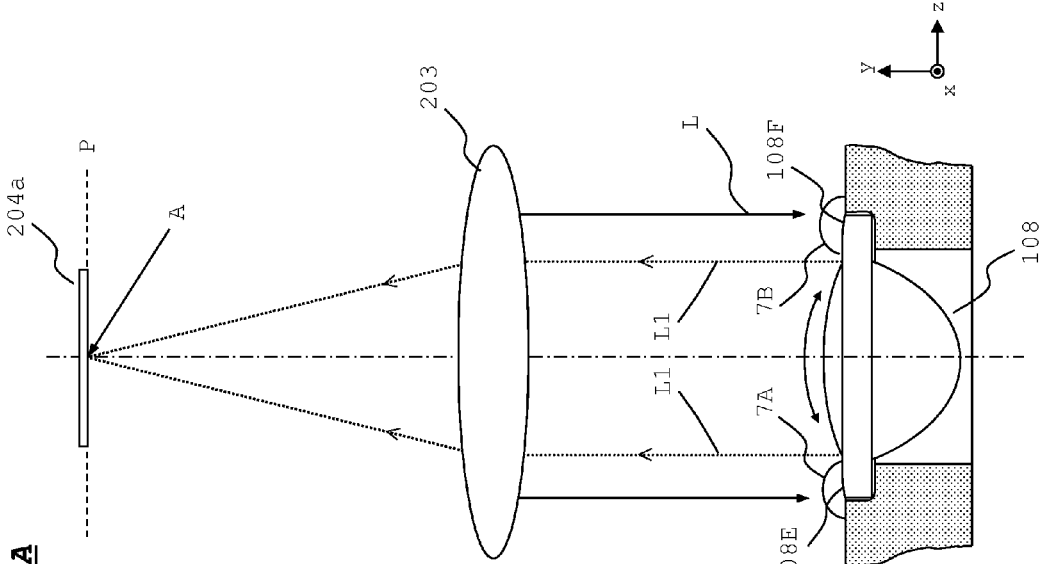

FIG. 16A is a diagram showing a state of each light in the case where the adhesive 7B is properly coated on the applied portion 108F, as well as on the applied portion 108E. In this case, since there is no reflection light L2 from the applied portion 108F, the point image BF also disappears from the screen on the display portion 4A, and there remains only the point image A, as a point image to be displayed on the screen.

Referring back to FIG. 12B, after the adhesives 7A and 7B are coated as described above, the angle adjustment of the objective lens 108 is performed in such a manner that the point image A is located at the intersection point of the straight lines TL1 and TL2 (S104). Specifically, the objective lens 108 is caused to swing in such a direction that the point image A shown in FIG. 16B is located at the broken-line position in FIG. 16B. After the angle adjustment is performed as described above, UV light is irradiated onto the adhesives 7A and 7B to cure the adhesives 7A and 7B (S105). Thereby, the objective lens 108 is fixedly attached to the holder 121.

Thereafter, workers check whether the point images BE and BF disappeared from the screen on the display portion 4A (S106). Then, in the case where there remains only the point image A on the screen (S106:YES), the workers judge that the adhesion operation has been properly performed, and finish the operation of mounting the objective lens 108 in the optical pickup device 3. On the other hand, in the case where there remains, on the screen, the point image BE or the point image BF in addition to the point image A (S106:NO), the workers determine that the operation of mounting the objective lens 108 in the optical pickup device 3 has failed, based on a judgment that the adhesive operation has not been properly performed (S107), and finish the operation for the optical pickup device 3. In the case where the mounting operation is judged to have failed, a post-processing for the optical pickup device 3 is performed e.g. by hands.

FIG. 17C exemplarily shows that a proper amount of the adhesive 7B has not been coated on the applied portion 108F.

In this case, since a part, of the applied portion 108F, which is indicated by the portion enclosed by the broken line in FIG. 17C, is exposed. Accordingly, as shown in FIG. 17A, the reflection light L2 from the exposed part is entered into the image sensor 204a. Thereby, the point image BF appears on the display portion 4A. Then, the workers can recognize that the adhesive operation has not been properly performed by inclusion of the point image BF on the screen. If the angle adjustment for the objective lens 108 is performed from the state shown in FIG. 17B, and the point image A is moved to the intersection point of the straight lines TL1 and TL2, the point image BF is also moved in accordance with the movement of the point image A.

After the checking on the adhesive operation is finished as described above, the laser light source 201 is turned off. Thus, the process of mounting the objective lens 108 in the optical pickup device 3 is ended.

As described above, according to the configuration example, it is possible to adjust the mounted angle of the objective lens 108 on the holder 121 by referring to the point image A to be displayed on the display portion 4A. Further, it is possible to easily determine whether the application state of adhesive to the objective lens 108 is proper by checking the presence or absence of the point images BE and BF in the display of the display portion 4A at the time of the angle adjustment operation.

According to the configuration example, it is also possible to check whether the adhesive operation to the objective lens 108 has been properly performed, by utilizing the auto collimator device 1 for use in adjusting an angle of the objective lens 108. Further, the checking operation can be performed together with the angle adjustment operation as a series of operations. With this arrangement, it is possible to easily and accurately determine whether the adhesive operation to the objective lens 108 has been properly performed, with enhanced workability.

In the configuration example, the angles α and β of the applied portions 108E and 108F may be angles that make it possible to display both of the point images BE and BF on the screen, in the case where the point image A is moved from the state shown in FIG. 14B to the intersection point of the straight lines TL1 and TL2. Specifically, the angles α and β may be defined in such a manner that: in the state shown in FIG. 14B, the point image BE is deviated from the screen; or in a state that at least the point image A is located at the intersection point of the straight lines TL1 and TL2, and the adhesives 7A and 7B are not coated on the applied portions 108E and 108F, the point images BE and BF are displayed on the screen of the display portion 4A. As described above, the angles α and β may not be equal to each other.

Figure 18A:
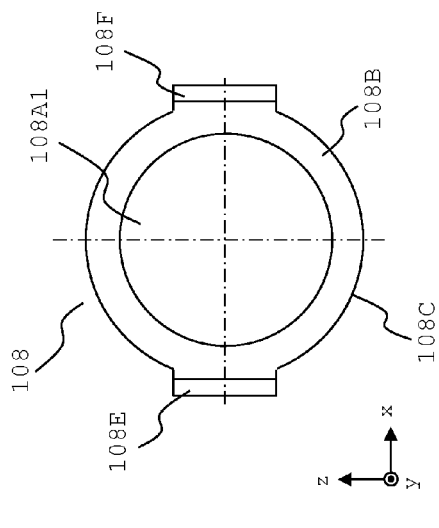
FIGS. 18A through 18E are diagrams showing arrangements of an objective lens according to modification examples.

Further, the shapes and the areas of the applied portions 108E and 108F may not be necessarily the same as each other. For instance, as shown in FIG. 18A, the applied portion 108E may have a smaller area than the applied portion 108F, or conversely, the applied portion 108F may have a smaller area than the applied portion 108E. In a modification example shown in FIG. 18A, the applied portion 108E is coated with a smaller amount of adhesive than the applied portion 108F. As a result, the point images BE and BF may disappear from the screen on the display portion 4A, regardless of a difference in application amount of the adhesives 7A and 7B respectively coated on the applied portions 108E and 108F. In such a case, in the modification example shown in FIG. 18A, a determination may be made such that the adhesive operation has been properly performed, despite a difference in application amount of the adhesives 7A and 7B to the applied portions 108E and 108F.

In view of the above, it is desirable to make the areas of the applied portions 108E and 108F to be the same as each other or substantially the same as each other for checking whether there is a difference in application amount of the adhesives 7A and 7B coated on the applied portions 108E and 108F. Further, it is also desirable to make the shapes of the applied portions 108E and 108F to be the same as each other or substantially the same as each other when viewed in minus y-axis direction, for determining whether the application states (e.g. applied areas) of the adhesives 7A and 7B are different from each other, regardless of the same application amount. In view of the above, as described in the configuration example, it is desirable to make the shapes and the areas of the applied portions 108E and 108F to be the same as each other for accurately checking a difference in application amount and application states of the adhesives 7A and 7B to the applied portions 108E and 108F.

Further, taking into consideration of the weight balance, it is desirable to form the application positions of the adhesives 7A and 7B to be symmetrical to each other with respect to the optical axis CO of the objective lens 108. Accordingly, it is desirable to form the applied portions 108E and 108F to have such shapes that the applied portions 108E and 108F are symmetrical or substantially symmetrical to each other with respect to the optical axis CO for checking whether the application positions of the adhesives 7A and 7B are symmetrical to each other with respect to the optical axis CO.

Figure 18B:
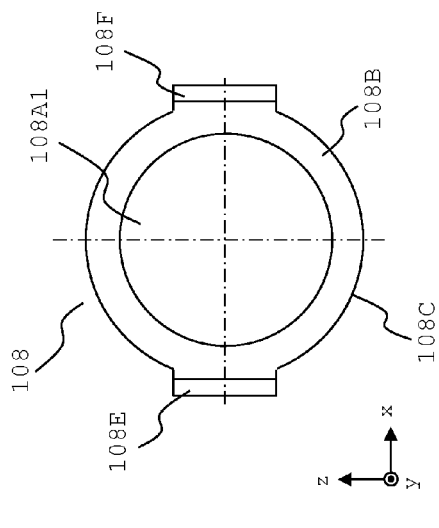

Further, in the configuration example, the two applied portions 108E and 108F are formed on the upper surface of the flange portion 108C. The number of applied portions is not limited to the above. For instance, as shown in FIG. 18B, three applied portions 108E, 108F and 108G may be formed on the upper surface of the flange portion 108C, or one or more than three applied portions may be formed. In the arrangement shown in FIG. 18B, three point images corresponding to the applied portions 108E, 108F and 108G appear on the screen of the display portion 4A.

Figure 18C:
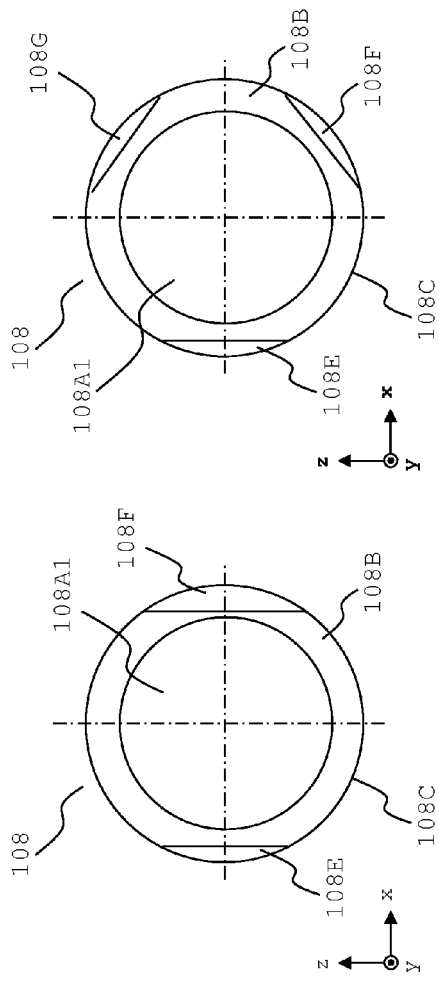

Further, in the configuration example, the applied portions 108E and 108F are formed on the upper surface of the flange portion 108C. The arrangement positions of the applied portions are not limited to the above. For instance, as shown in FIG. 18C, areas projecting from the flange portion 108C in the radial direction of the objective lens 108 may be formed, and applied portions 108E and 108F whose upper surfaces are inclined with respect to the reflecting flat portion 108B may be formed on the areas. In the modification example, recesses for receiving the applied portions 108E and 108F are formed in the upper surface 121B of the holder 121.

It is preferable to form the applied portions 108E and 108F on the upper surface of the flange portion 108C as well as the reflecting flat portion 108B. Specifically, in the configuration example, the parallel light L is irradiated onto an area slightly larger than the outer circumference of the flange portion 108C for irradiating the reflecting flat portion 108B formed on the upper surface of the flange portion 108C with parallel light in adjusting a tilt of the objective lens 108. Accordingly, forming the applied portions 108E and 108F on the upper surface of the flange portion 108C allows the parallel light L, which is irradiated in adjusting a tilt of the objective lens 108, to be irradiated onto the applied portions 108E and 108F, as well as onto the reflecting flat portion 108B. Thus, it is possible to smoothly check the application states of the adhesives 7A and 7B after the tilt adjustment, without the need of changing the irradiation area of the parallel light L. In the configuration example, the reflecting flat portion 108B is formed to have such a contour portion, on the upper surface of the flange portion 108C, that is formed by removing a part from a circular portion; and the applied portions 108E and 108F are formed in a region between the circular portion and the contour portion of the reflecting flat portion 108B. With this arrangement, it is possible to simultaneously irradiate the reflecting flat portion 108B, and the applied portions 108E and 108F with the parallel light L, and the aforementioned effect is provided.

Figure 18D:
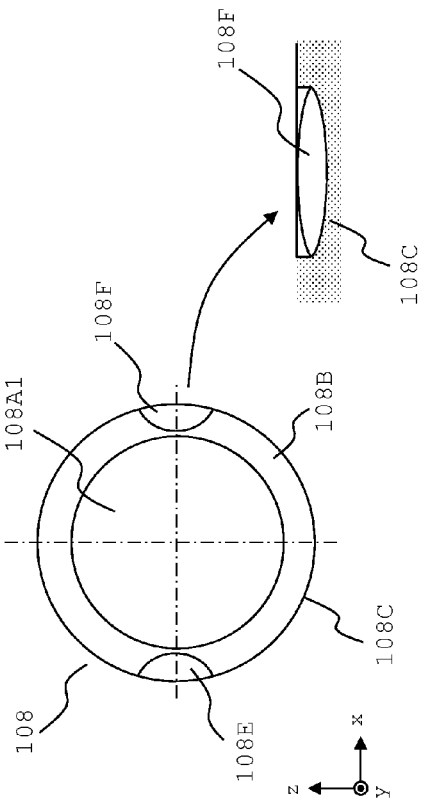

Further, in the configuration example, the applied portions 108E and 108F respectively have such shapes that the reflecting flat portion 108B is cut away by planes inclined with respect to the reflecting flat portion 108B by the degrees α and β in minus y-axis direction. The shapes of the applied portions 108E and 108F are not limited to the above. For instance, as shown in FIG. 18D, two recesses, as the applied portions 108E and 108F, may be formed side by side in x-axis direction in the reflecting flat portion 108B, and bottom surfaces of the recesses may be inclined with respect to the reflecting flat portion 108B. The lower right portion of FIG. 18D shows a partially side view of the applied portion 108F, when viewed in minus x-axis direction.

In the above modification example, the applied portions 108E and 108F (recesses) are formed into an arc shape, and have substantially the same shapes as each other in plan view. The bottom surfaces of the applied portions 108E and 108F are continued to the reflecting flat portion 108B at the positions, of the applied portions 108E and 108F, which are closest to the center of the objective lens 108. Forming the recesses in the aforementioned manner is advantageous in restricting an area where the adhesive 7 is to be coated, and is used for checking the application states of the adhesives 7A and 7B, as compared with the configuration example (see FIGS. 11A through 11D), and in securely coating the adhesives 7A and 7B within the applied portions 108E and 108F. The modification example shown in FIG. 18D is an example of the lens recited in claim 7.

Figure 18E:
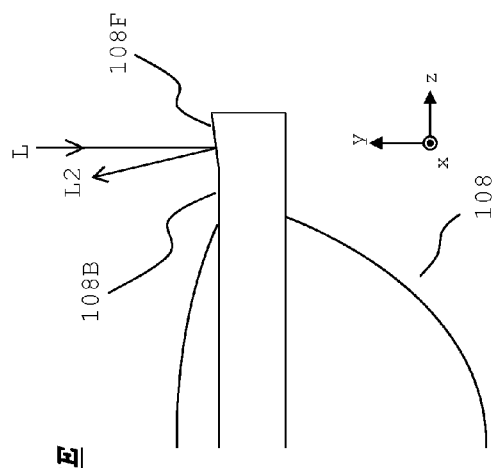

Further, in the configuration example, the applied portions 108E and 108F are inclined with respect to the reflecting flat portion 108B in minus y-axis direction (a direction in parallel to y-z plane). The direction of inclining the applied portions 108E and 108F is not limited to the above. For instance, as shown in FIG. 18E, the applied portions 108E and 108F may be inclined with respect to the reflecting flat portion 108B in plus y-axis direction (a direction in parallel to y-z plane), or may be inclined in a direction other than the above. FIG. 18E exemplarily shows a modification example of the applied portion 108F. In FIG. 18E, the applied portion 108E is inclined with respect to the reflecting flat portion 108B in such a manner that an outer circumferential portion of the applied portion 108E is set high, as well as the applied portion 108F. In the modification example, the point image BF is located on the left side of the point image A, and the point image BE is located on the right side of the point image A, on the display screen shown in FIG. 14B.

Further, in the adjustment process shown in FIG. 12B, the judgment as to whether the point images BE and BF disappeared from the screen (S106) is performed after the curing step (S105) of the adhesives 7A and 7B. The order of these steps is not limited to the above. For instance, as shown in FIG. 19A, S106 may be provided between S103 and S104, and if the point images BE and BF have not disappeared from the screen (S106:NO), it may be judged that the adjustment operation has failed (S107), and the angle adjustment (S104) may be skipped. In the modification example, as shown in FIG. 19B, the irradiation of UV light (S105) may be omitted.

Further, in the configuration example, there has been exemplarily described a three-wavelength compatible optical pickup device compatible with BD, DVD and CD. An optical pickup device and an objective lens to which the invention is applied are not limited to the above. For instance, the invention is also applicable to a two-wavelength compatible optical pickup device compatible with DVD and CD, or an optical pickup device compatible only with CD. Further, the invention is also applicable to an objective lens to be incorporated in these optical pickup devices. FIGS. 10A and 10B show a configuration example, in which BD light, DVD light and CD light are entered to a single objective lens 108. Alternatively, an objective lens to which BD light is entered, and an objective lens to which DVD light and CD light are entered may be individually mounted on the holder 121. In the modification example, the arrangement and the objective lens mounting process in the aforementioned configuration example may be applied to these two objective lenses.

Further, the configuration example is an example, in which the invention is applied to the objective lens 108 in the optical pickup device 3. However, an element to which the invention is applied is not limited to the above. For instance, it is possible to apply the invention to the collimator lens 105 shown in FIG. 10A, or it is possible to apply the invention to other lens to be incorporated in the optical pickup device, or a lens to be incorporated in an optical device other than the optical pickup device. Further, the arrangement of the mounting portion on which the objective lens 108 or other lens is mounted is not limited to the foregoing example or the configuration example.

The embodiment of the invention may be changed or modified in various ways as necessary, as far as such changes and modifications do not depart from the scope of the claims of the invention hereinafter defined.

What is claimed is:

1. A lens, comprising:
a lens portion which condenses light;
a reflecting flat portion which is formed in a periphery of the lens portion and reflects parallel light irradiated to the reflecting flat portion; and
a flange portion which is adhered to a lens holder by an adhesive, wherein
an applied portion of the adhesive which is formed on the flange portion is inclined with respect to the reflecting flat portion.

2. The lens according to claim 1, wherein
the reflecting flat portion is formed to have a contour portion on an upper surface of the flange portion, the contour portion being formed by removing a part from a circular portion, and
the applied portion is formed in a region between the circular portion and the contour portion.

3. The lens according to claim 1, wherein
a plurality of the applied portions are formed.

4. The lens according to claim 3, wherein
areas of the applied portions are substantially the same as each other.

5. The lens according to claim 4, wherein
shapes of the applied portions are substantially the same as each other.

6. The lens according to claim 3, wherein
the applied portions have such shapes that the applied portions are substantially symmetrical to each other with respect to an optical axis of the lens portion.

7. The lens according to claim 1, wherein
an upper surface of the flange portion is formed with a recess, and
the applied portion is formed in the recess.

8. A method for mounting a lens, the lens being provided with a lens portion which condenses light, a reflecting flat portion which is formed in a periphery of the lens portion and reflects parallel light irradiated to the reflecting flat portion, and a flange portion which is adhered to a lens holder by an adhesive, an applied portion of the adhesive which is formed on the flange portion being inclined with respect to the reflecting flat portion, the lens mounting method comprising steps of:
irradiating the applied portion which is inclined with the parallel light emitted from an auto collimator device; and
determining whether an application state of the adhesive is proper or not based on presence or absence of the parallel light reflected on the applied portion.

9. The lens mounting method according to claim 8, further comprising:
a step of detecting the presence or absence of the parallel light reflected on the applied portion by the auto collimator device.

10. The lens mounting method according to claim 8, further comprising:
a step of adjusting a tilt of the lens by irradiating the reflecting flat portion with the parallel light.

11. An optical pickup device, comprising:
a laser light source which emits laser light;
a photodetector which receives the laser light reflected on a disc; and
an optical system which includes a lens, guides the laser light emitted from the laser light source to the disc, and guides the laser light reflected on the disc to the photodetector,
the lens including:
a lens portion which condenses light,
a reflecting flat portion which is formed in a periphery of the lens portion and reflects parallel light irradiated to the reflecting flat portion; and
a flange portion which is adhered to a lens holder by an adhesive, wherein
an applied portion of the adhesive which is formed on the flange portion is inclined with respect to the reflecting flat portion.

12. The optical pickup device according to claim 11, wherein
the reflecting flat portion is formed to have a contour portion on an upper surface of the flange portion, the contour portion being formed by removing a part from a circular portion, and
the applied portion is formed in a region between the circular portion and the contour portion.

13. The optical pickup device according to claim 11, wherein
a plurality of the applied portions are formed.

14. The optical pickup device according to claim 13, wherein
areas of the applied portions are substantially the same as each other.

15. The optical pickup device according to claim 14, wherein
shapes of the applied portions are substantially the same as each other.

16. The optical pickup device according to claim 13, wherein
the applied portions have such shapes that the applied portions are substantially symmetrical to each other with respect to an optical axis of the lens portion.

17. The optical pickup device according to claim 11, wherein
an upper surface of the flange portion is formed with a recess, and
the applied portion is formed in the recess.

* * * * *